SOLID STATE POWER CIRCUITS

Original Filed April 30, 1964 11 Sheets-Sheet 1

Inventor:
Raymond E. Morgan,
by Paul A. Frank
His Attorney.

Inventor:
Raymond E. Morgan,
by Paul A. Frank
His Attorney.

Nov. 17, 1970 R. E. MORGAN 3,541,358

SOLID STATE POWER CIRCUITS

Original Filed April 30, 1964 11 Sheets-Sheet 3

Inventor:
Raymond E. Morgan,
by Paul A. Frank
His Attorney.

Nov. 17, 1970 R. E. MORGAN 3,541,358

SOLID STATE POWER CIRCUITS

Original Filed April 30, 1964 11 Sheets-Sheet 4

Inventor:
Raymond E. Morgan,
by Paul A. Frank
His Attorney.

Inventor:
Raymond E. Morgan,
by Paul A. Frank
His Attorney.

Inventor:
Raymond E. Morgan,
by Paul A. Frank
His Attorney.

Nov. 17, 1970 R. E. MORGAN 3,541,358

SOLID STATE POWER CIRCUITS

Original Filed April 30, 1964 11 Sheets-Sheet 7

Inventor:
Raymond E. Morgan,
by Paul A. Frank
His Attorney.

Inventor:
Raymond E. Morgan,
by Paul A. Frank
His Attorney.

Inventor:
Raymond E. Morgan,
by Paul A. Frank
His Attorney.

Nov. 17, 1970 R. E. MORGAN 3,541,358

SOLID STATE POWER CIRCUITS

Original Filed April 30, 1964 11 Sheets-Sheet 10

Inventor:
Raymond E. Morgan,
by Paul A. Frank
His Attorney.

Inventor:
Raymond E. Morgan,
by Paul A. Frank
His Attorney.

United States Patent Office 3,541,358
Patented Nov. 17, 1970

3,541,358

SOLID STATE POWER CIRCUITS

Raymond E. Morgan, deceased, late of Schenectady County, N.Y., by Agnes T. Morgan, administratrix, Schenectady County, N.Y., assignor to General Electric Company, a corporation of New York Continuation of application Ser. No. 363,792, Apr. 30, 1964. This application May 16, 1968, Ser. No. 731,677
Int. Cl. H03k *17/00*
U.S. Cl. 307—305 44 Claims

ABSTRACT OF THE DISCLOSURE

The invention comprises a family of improved power circuits using turn-on, nongate turn-off, controlled conducting devices. The power circuit is comprised by a pair of controlled conducting devices interconnected with a tapped inductance winding in series circuit relationship across a pair of power supply terminals which are adapted to be connected across a source of relatively constant electric potential with at least one of the pair of devices comprising a solid state, bidirectional conducting device A commutation circuit is provided which includes the inductance winding and at least one commutation capacitor directly connected between one of the power supply terminals and the tap point of the inductance winding. Upon rendering the controlled conducting devices conductive during selected time intervals a desired value electric current of a desired polarity is supplied to or from a load circuit connected to the inductance winding.

IMPROVED SOLID STATE POWER CIRCUITS

This invention relates to a family of new and improved power circuits employing new controlled turn-on conducting devices and a new and improved turn-off or commutation means therefore, and is a continuation application of copending U.S. application Ser. No. 363,792, filed Apr. 30, 1964, Solid State Power Circuits, assigned to the General Electric Company now abandoned.

More particularly, the invention relates to a family of power circuits employing turn-on, nongate turn-off solid state semiconductor controlled devices for power switching purposes and is especially useful in time-ratio control of direct current electric power or for inversion of direct current electric power to alternating current electric power. Time-ratio control of direct current electric power refers to the interruption or chopping up of a direct current electric potential by controlling the "on" time of a turn-on, turn-off power switching device connected in circuit relationship with a load and the direct current electric potential. Inversion of direct current electric power to alternating current electric power refers to the switching of a load across alternate output terminals of a direct current electric supply by appropriately switching turn-on, turn-off power switching devices connecting the load in circuit relationship with the direct current electric supply.

In recent years, the turn-on, turn-off power switching devices employed in the above described types of power circuits for the most part have employed a solid state semiconductor device known as a silicon controlled rectifier (SCR). The SCR is a four-layer PNPN junction device having a gating electrode which is capable of turning on current flow through the device with only a relatively small gating signal. The conventional SCR, however, is a nongate turn-off device in that once conduction through the device is initiated, the gate thereafter loses control over conduction through the device until it has been switched off by suitable external means. Such external means are generally referred to as commutation circuits and usually effect commutation or turning off of the SCR by reversal of the potential across the SCR. In addition to the SCR, recent advances in the semiconductor art have made available to industry new solid state semiconductor devices which are controlled turn-on, nongate turn-off conducting devices, but which are bidirectional conducting devices. A bidirectional conducting device is a device capable of conducting electric current in either direction through the device. The first of these devices, referred to as a "triac," is a gate controlled turn-on NPNPN junction device which, similar to the SCR, is a nongate turn-off device that must be turned off by external commutation circuit means. While the preferred form of a triac is a five-layer gate controlled device, it should be noted that four-layer PNPN and NPNP junction gate controlled triac devices are practical, as well as other variations, but the triac characteristics mentioned above are common to all. The second newly available power device, referred to as a "power diac" is a two-terminal, five-layer NPNPN junction device which, like the triac, has bidirectional conducting characteristics. In contrast to the SCR and triac, however, the diac is not a gate turn-on device, but must be turned on by the application of a relatively steep voltage pulse (high $dv/dt$) applied across its terminals. It should be noted that the SCR and triac may also be fired by the same high $dv/dt$ technique. However, the diac is similar to the SCR and the triac in that it too must be turned off by external circuit commutation means. My invention provides new and improved power circuits employing solid state semiconductor devices of the above general type as well as a new and improved commutation scheme for use with such devices. It should be expressly noted in this regard, that the term "non-gate turn-off device" as employed herein is intended to include not only the specific devices discussed above but also include so-called gate assisted turn-off devices (sometimes referred to as a GTOSCR) which require some form of external commutation to assure complete turn-off, although the device is capable of achieving some degree of turn-off by the application of a reverse polarity, turn-off signal to its control gate. Other known devices which exhibit the necessary bidirectional conducting characteristic (and whose conduction can be controlled in at least one direction) required to practice the present invention are such arrangements as reverse polarity, parallel connected SCR's as well as a single SCR and reverse polarity, parallel connected diode, etc. Power circuits employing such bidirectional conducting devices have been disclosed in the published literature as well as in certain copending applications of applicant. See for example U.S. patent application Ser. No. 354,888, filed Mar. 26, 1964, Raymond E. Morgan and Burnice D. Bedford, inventors, entitled "Solid State Power Circuits" and assigned to the General Electric Company, now Pat. No. 3,376,492 granted Apr. 2, 1968.

It is, therefore, a primary object of the invention to provide an entire family of new and improved power circuits employing controlled turn-on, nongate turn-off conducting devices.

Another object of the invention is to provide a new and improved commutation scheme for power circuits employing controlled turn-on, nongate turn-off conducting devices which allows for a reduction in the size of components employed in the circuit for a given power rating and, hence, is economical to manufacture.

A further object of the invention is to provide a new and improved commutation scheme which is economical and efficient in operation and which provides reliable commutation that is independent of load from no load to full load operating conditions.

In practicing the invention new and improved power circuits are provided using controlled turn-on, nongate turn-off solid state semiconductor devices. These new and improved power circuits include in combination a pair of interconnected turn-on, nongate turn-off controlled conductig devices in series circuit relationship across a pair of power supply terminals that, in turn, are adapted to be connected across a source of electric potential. The pair of controlled conducting devices are interconnected by means of a tapped inductance winding. A first of the pair of controlled conducting devices is also connected in series circuit relationship with a load circuit including a filter network wherein the load circuit is connected between the tap point of the inductance winding and one of the power supply terminals. Turn-on gating and firing circuit means are provided for controlling the turn-on of the controlled conducting devices, and commutation circuits means are provided for commutating off the devices at desired intervals. The commutation circuit means comprises the tapped inductance and a pair of series connected commutatiing capacitors wherein a first of the capacitors is connected between the tap point of the inductance and a first of the power supply terminals and the second is connected between the same tap point and the second power supply terminal.

The features of the invention which it is desired to protect herein are pointed out with particularity in the appended claims. The invention itself, however, both as to its organization and method of operation, together with further objects and advantages thereof, may best be understood by reference to the following description taken in connection with the accompnying drawings where like parts in each of the drawings are identified by the same character reference and wherein:

Figure 7:
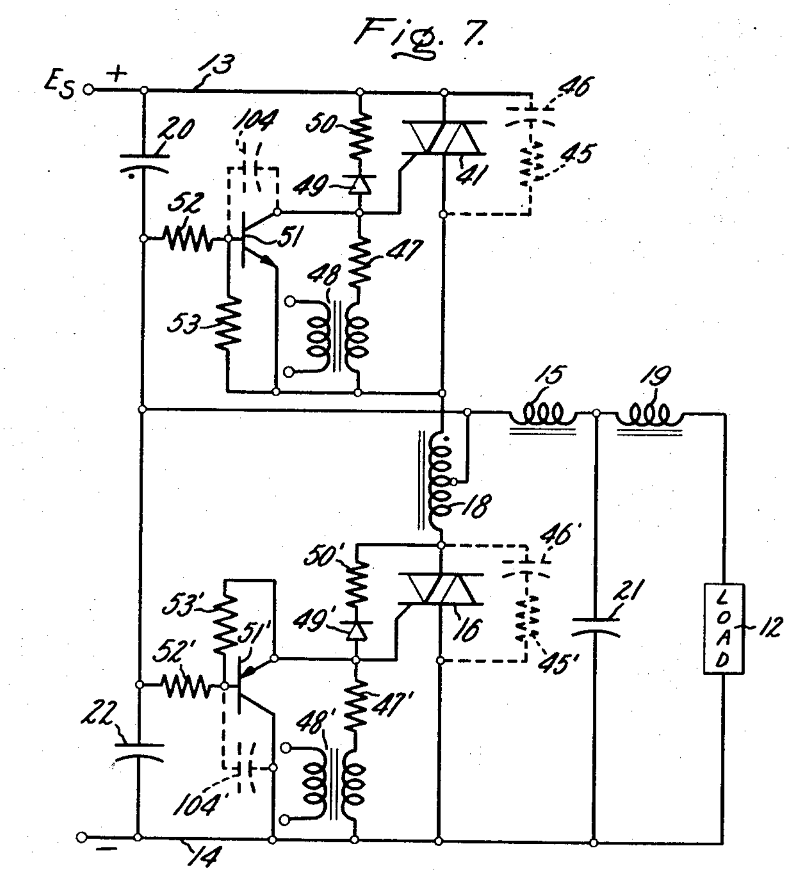
FIG. 7 is a detailed circuit diagram of the circuit shown in FIG. 6 including the details of the triac gate firing circuits.
Figure 10:
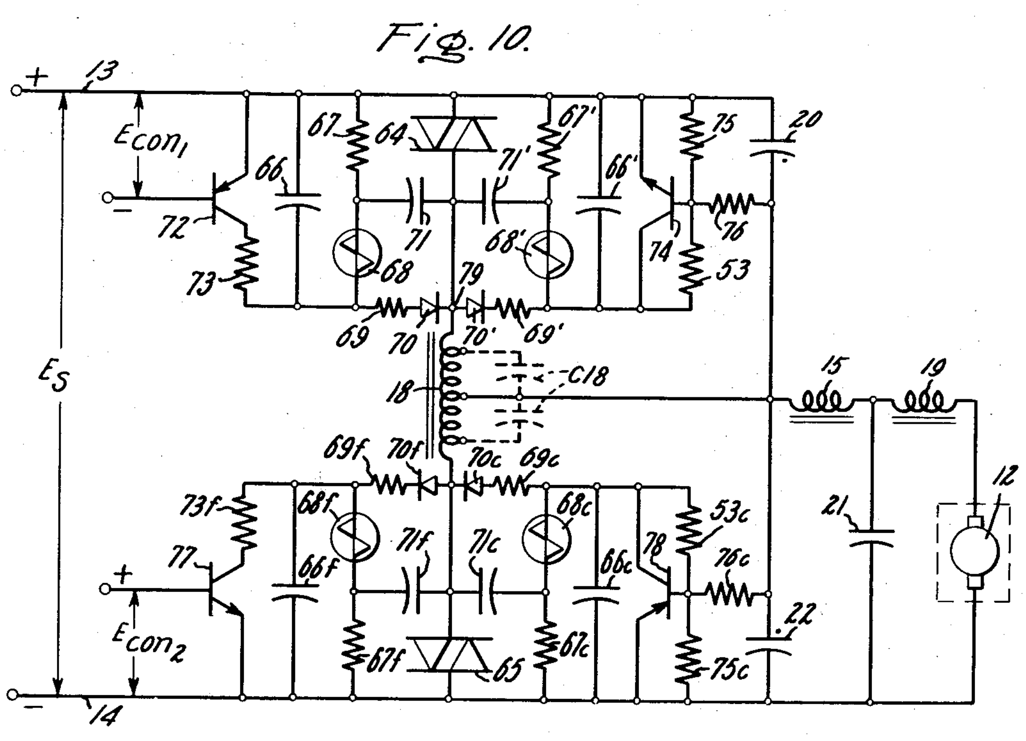
FIG. 10 is a detailed diagram of a new and improved time-ratio control power circuit incorporating many of the features of the circuit shown in FIG. 9, and illustrates a different form of firing circuit means for turning on a diac or a *dv/dt* fired SCR; and, in addition, illustrates a third form of capacitor isolation between the two firing circuits.
Figure 16:
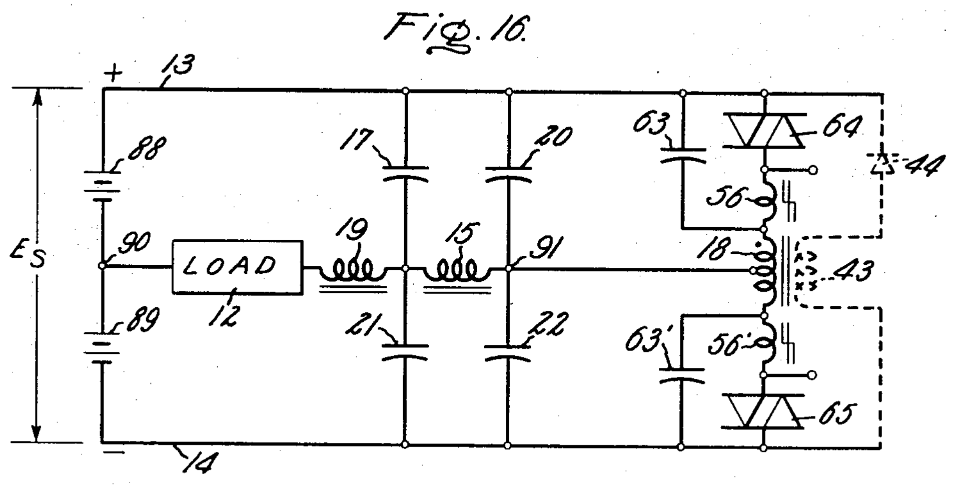
Figure 17:
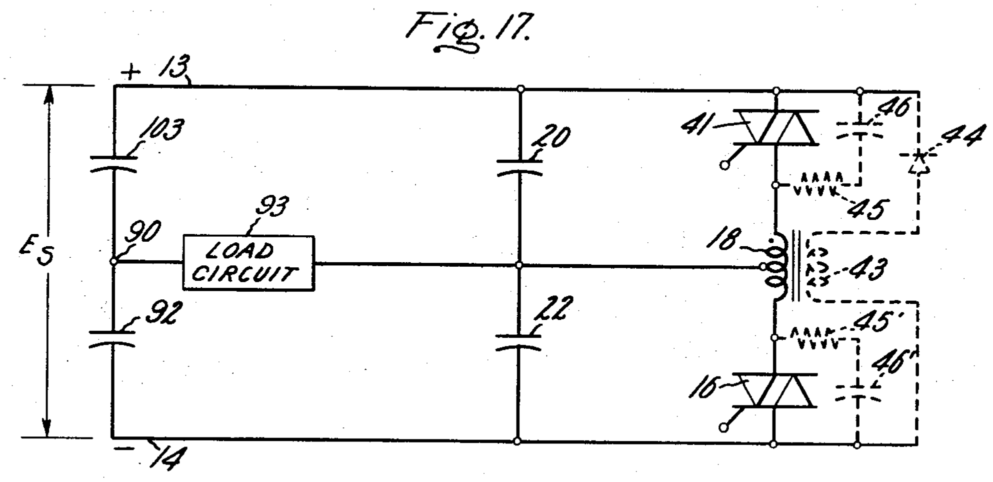
Figure 18:
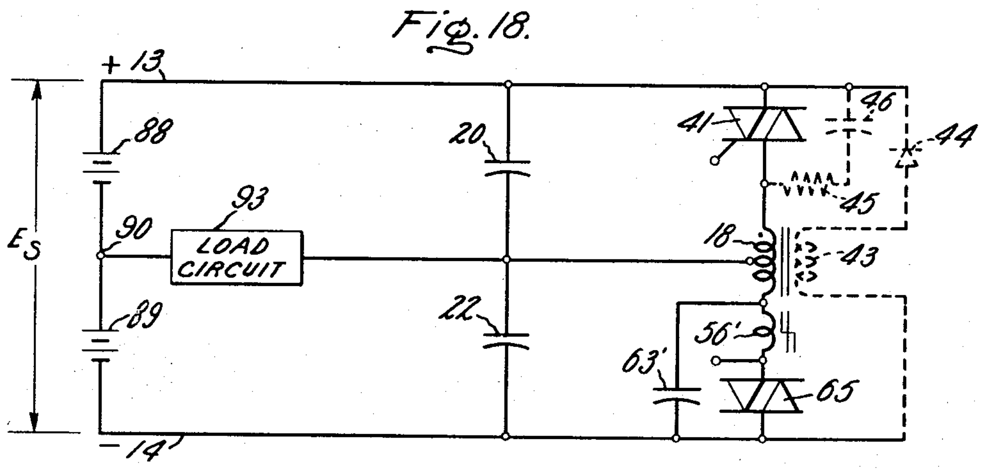
Figure 19:
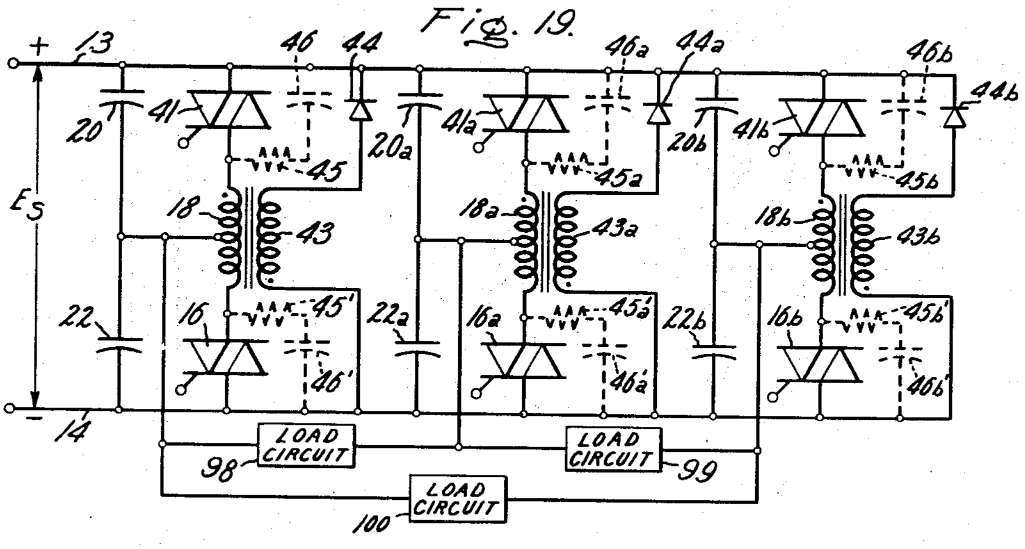
Figure 20:
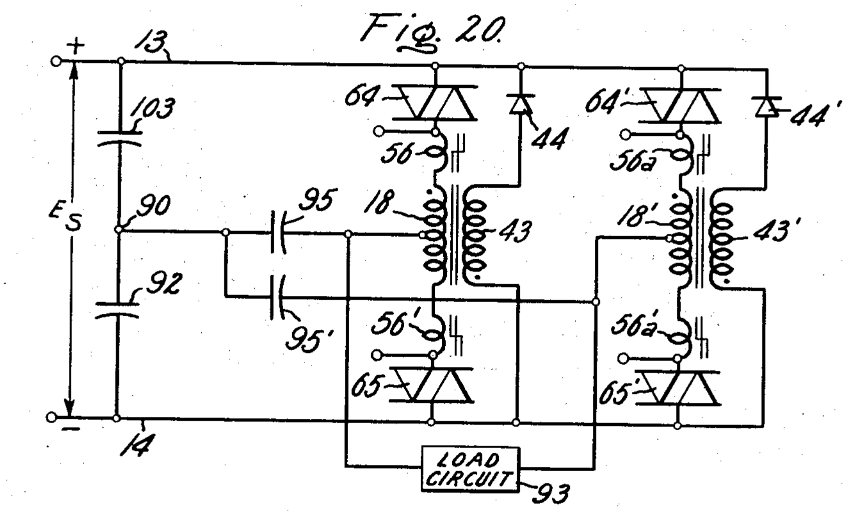
Figure 21:
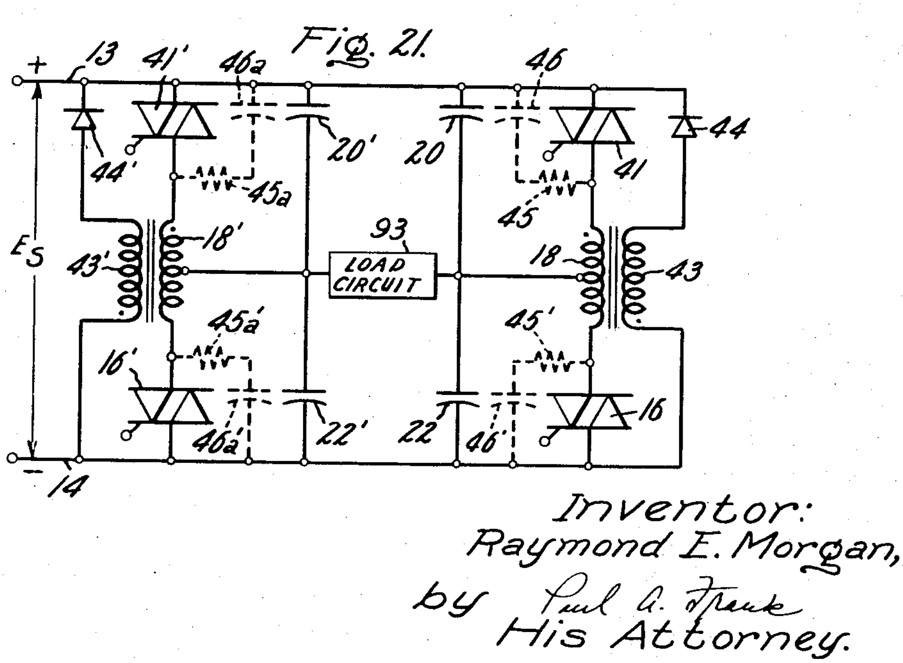
Figure 22:
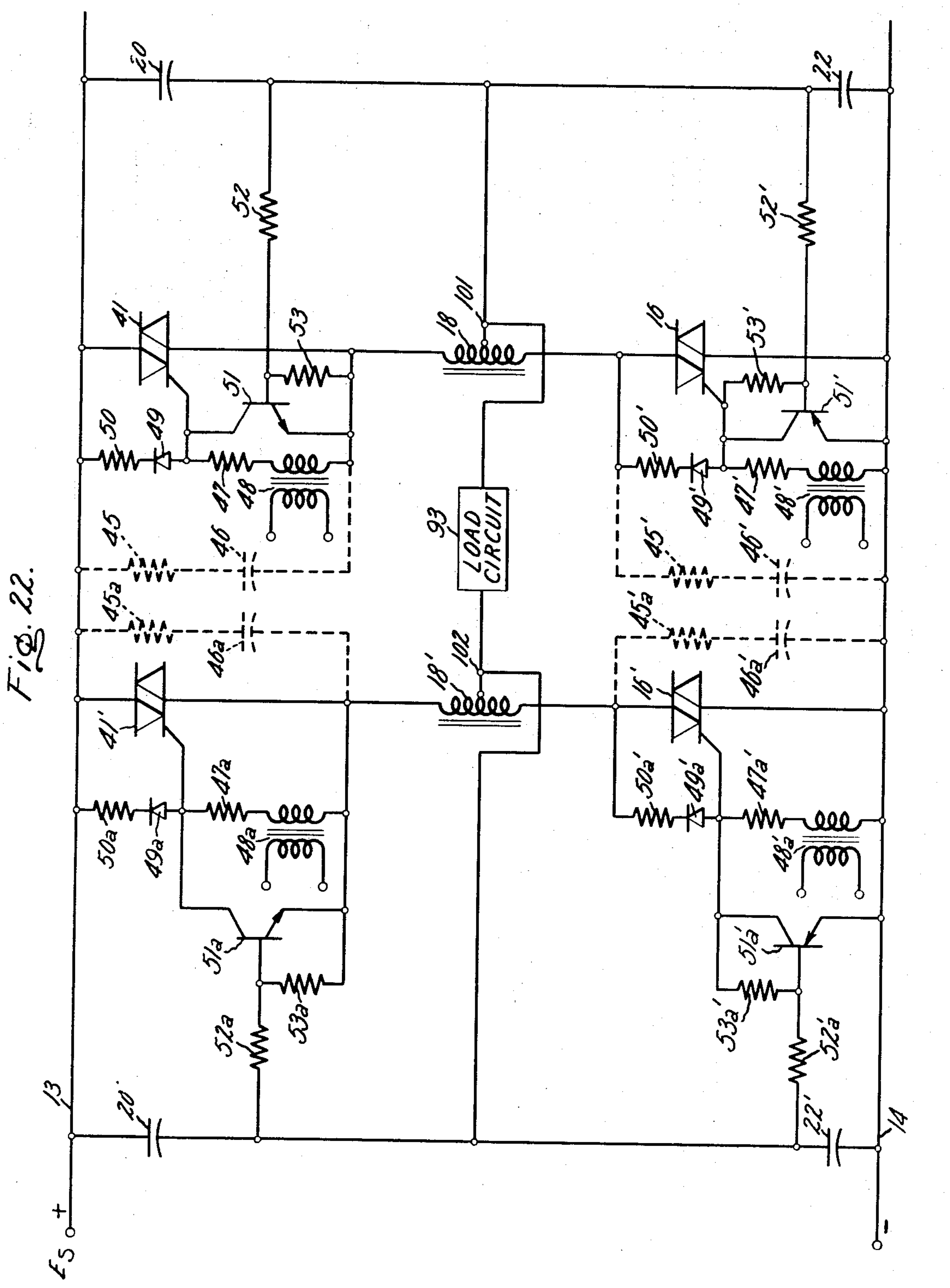
Figure 23:
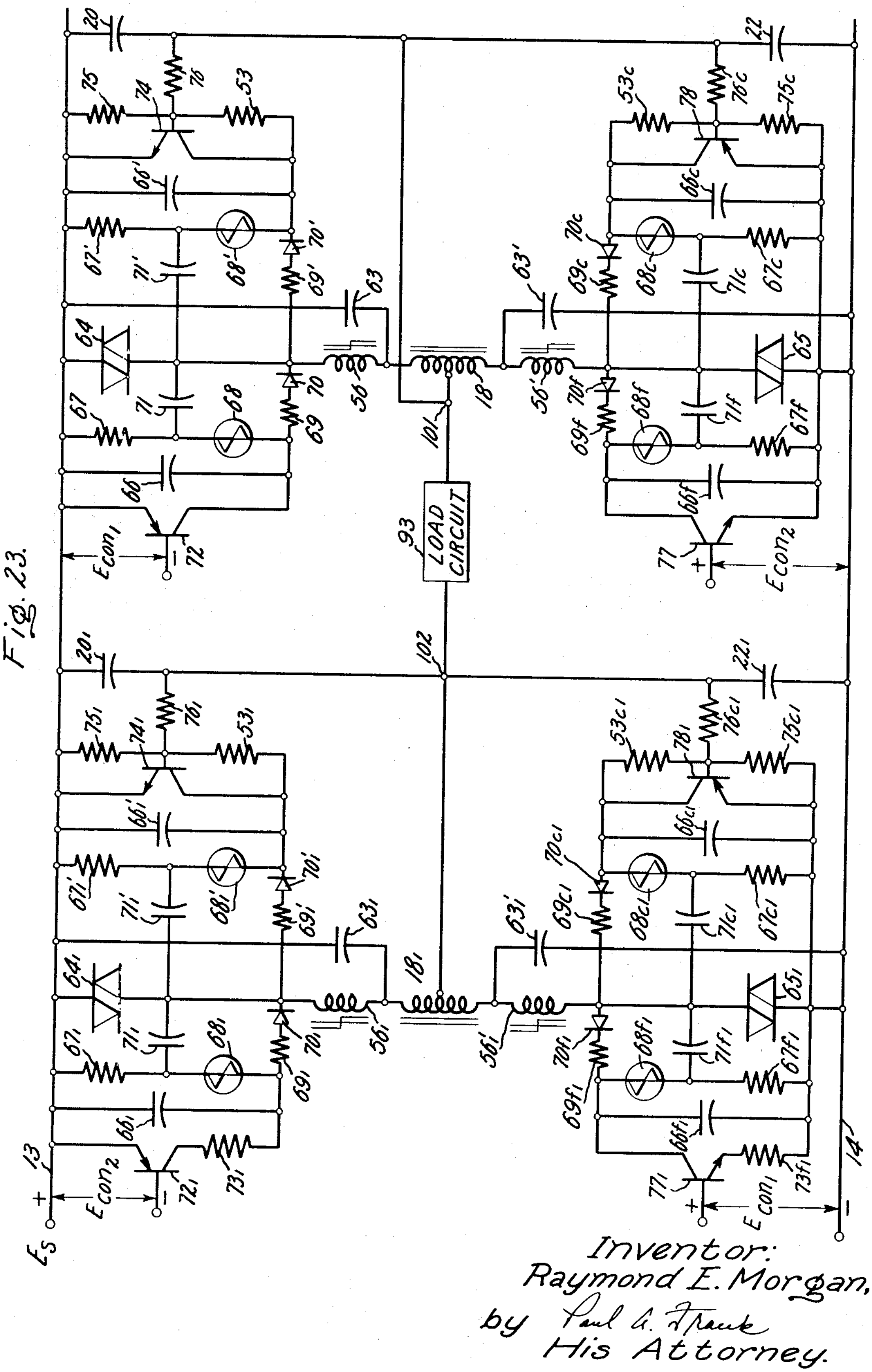

FIG. 16 is a detailed circuit diagram of a new and improved power circuit employing gate turn-on diac devices and the new and improved commutation scheme wherein the power circuit is operable either as a time-ratio control power circuit providing direct current load current flow in either of two directions or a single-phase inverter circuit depending upon the particular sequence of firing the SCR's with power drawn from the source or pumped back into the source;

FIG. 17 is a detailed circuit diagram of a new and improved single-phase inverter circuit employing the new and improved commutation scheme of the invention and using two triacs;

FIG. 18 is a modification of the power circuit shown in FIG. 16 wherein a triac is substituted for the *dv/dt* fired diac and the load circuit impedance replaces the inductive impedance of FIG. 16;

FIG. 19 is a detailed circuit diagram of a three-phase power circuit employing as its basic building block the circuit of the single-phase inverter of FIGS. 17 and 18;

FIG. 20 is a detailed circuit diagram of a single-phase, full-wave bridge power circuit, and, in addition, the commutation circuit is rearranged;

FIG. 21 is a detailed circuit diagram of a second form of a single-phase, full-wave bridge power circuit employing as its basic building block the circuit of the single-phase inverter of FIGS. 17 and 18;

FIG. 22 is a detailed circuit diagram of a new and improved single-phase, full-wave bridge power circuit employing as its basic building block the circuit shown in FIG. 7; and FIG. 23 is a detailed circuit diagram of a new and improved single phase, full-wave bridge power circuit employing as its basic building block the circuit shown in FIG. 10.

Figure 1:
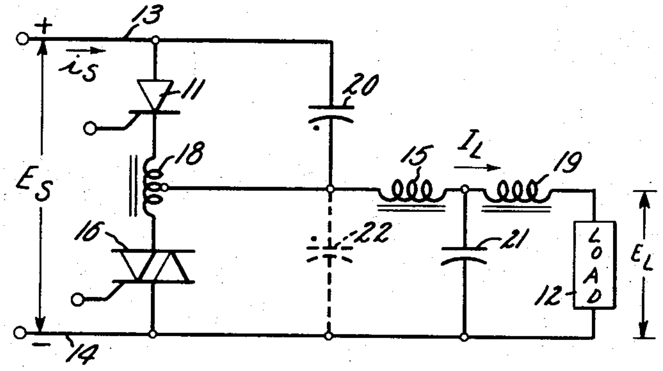
FIG. 1 is a detailed circuit diagram of a new and improved time-ratio control power circuit employing a new and improved commutation means in accordance with the invention.

A new and improved time-ratio control power circuit illustrated in FIG. 1 of the drawings is comprised by a gate turn-on, nongate turn-off solid state silicon controlled rectifier device SCR 11, and a load 12, effectively coupled in series circuit relationship across a pair of power supply terminals 13 and 14 which, in turn, are adapted to be connected across a source of electric potential. In the particular embodiments of the invention shown herein, the source of electric potential $E_S$ is a direct current power supply having its positive potential applied to terminal 13 and its negative potential applied to terminal 14. It should be noted that while the time-ratio control circuits herein disclosed are drawn in connection with direct current power supplies, with very little modification these circuits could be used to remove or chop out any desired portion of a half-cycle of applied alternating current potential. A filter circuit comprising inductances 15, 19 and capacitor 21 is connected in series circuit relationship intermediate SCR 11 and load 12, and a gate turn-on, nongate turn-off solid state triac bidirectional conducting device 16 is connected in parallel circuit relationship with the filter circuit and load 12. The triac is a gate turn-on, nongate turn-off, bidirectional conducting device which has been newly introduced to the electrical industry by the Rectifier Components Department of the General Electric Company, Auburn, N.Y. Similar to the SCR, the triac may be switched from a high impedance blocking state to a low impedance conducting state when a low voltage gate signal is applied between the gate terminal and one of the load terminals. Also, like the SCR, once the triac is switched to the low impedance conducting state, the gate electrode loses control and current flow through the device must be interrupted by some external means while the gate signal is removed in order to return the triac to its high impedance blocking state. A further characteristic of the triac is that once it is gated on, it will conduct current through the device in either direction, depending upon the polarity of the potential across the device. For a more detailed description of the triac gate turn-on, nongate turn-off, solid state semiconductor device, reference is made to an article entitled "Bilateral SCR Lets Designers Economize on Circuitry" by E. K. Howell appearing in the Jan. 20, 1964 issue of Electronic Design magazine.

Commutation circuit means are provided for terminating the conduction (turning off) of SCR 11 and comprise a tapped inductance winding 18 which may be autotransformer, as shown, or a tapped primary winding of a transformer as disclosed hereinafter, which interconnects SCR 11 and triac 16, and a pair of series connected commutating capacitors 20 and 22. Inductance winding 18 is preferably a loosely coupled winding having a coupling coefficient in the range of less than 0.7 but may be 0.7 to 1.0, however, it may be more tightly coupled at the expense of increasing the size of the commutating capacitors. The value of the inductance of winding 18 is determined by two conditions to be described hereinafter.

Capacitor 20 is connected between the tap point of inductance 18 and power supply terminal 13. Capacitor 22 (shown in dotted line form) is connected between the tap point and the negative power supply terminal 14. Commutating capacitor 22 is shown in dotted line form since such element would not be required in the event that the direct current power source supplies an infinite or stiff bus, that is, maintains a constant output voltage and capacitor 22 may be substituted for capacitor 20. In the more general case, the output voltage is slightly variable and in such case, capacitor 22 would be connected as shown. Properly phased gating-on signals are applied to the gating-on electrodes of SCR 11 and triac 16 from a suitable gating signal control circuit such as that shown in FIG. 4 of the drawings for gating on the SCR and triac in properly timed sequence as explained hereinafter. Due to the unidirectional conducting characteristics of the SCR, the circuit illustrated in FIG. 1 can only be employed to supply current from a power source to load 12 or to circulate load current within the triac-load loop, but cannot operate in a pumpback mode wherein current is fed back from the load to the power source, as other embodiments of the invention that are illustrated in FIG. 7 and described later in this application.

In operation, if it is assumed that initially SCR 11, which for purposes of explanation will be defined as a load current carrying SCR, and triac 16, which for this purpose will be described as a coasting and pumpback triac, are each in their nonconducting or blocking state, then capacitor 20 is charged to the power supply voltage $E_s$ and capacitor 22 has no charge thereon for the convenience of this description. The circuit remains in this condition until such time that a gating-on signal is applied to the gating-on electrode of SCR 11. Upon this occurrence, SCR 11 becomes conducting or turned on, an exciting current is built up in inductance 18, and load current $i_L$ begins to build up and supply the load. During the initial interval, inductance 18 functions as a current limiting reactor to limit the rate of rise of the exciting current to a desired level. Upon SCR 11 becoming conducting, initially the full power supply voltage $E_s$ is essentially across the upper portion of inductance winding 18, that is, from the SCR 11 end of inductance winding 18 to the tap point thereof. It will be assumed, for purposes of explanation, that winding 18 is center-tapped, although in the most general case the tap point need not be at the center. It, therefore, follows that since the center tap of winding 18 is initially at zero voltage, the immediate rise of voltage at the SCR end of winding 18 from 0 to full supply voltage causes capacitor 22 to begin to charge and capacitor 20 to discharge as a result of resonance between 18 and 22 with triac 16 still being non-conductive. The first condition determining the value of the inductance of winding 18 is that it be sufficiently small to permit capacitors 22 and 20 to charge and reverse charge, respectively, and render SCR 11 nonconducting. With SCR 11 conducting, the load current $I_L$ flows in the series circuit comprising SCR 11, the upper half of winding 18, the filter circuit and load 12. Under such conditions, the center tap of inductance winding 18, the dot end of capacitor 20, and the dot end of capacitor 22 will oscillate above the voltage of supply terminal 13 either automatically or by turn-on of triac 16. Load current carrying SCR 11 would remain conducting for a time period dependent upon the time of a half cycle of oscillation of inductance winding 18 and capacitors 20 and 22 and would then be rendered nonconducting or commutated off. The cycles are repeated at a rate to determine the amount of current to be supplied to load 12 in the manner of a time-ratio control power circuit.

Figure 2:
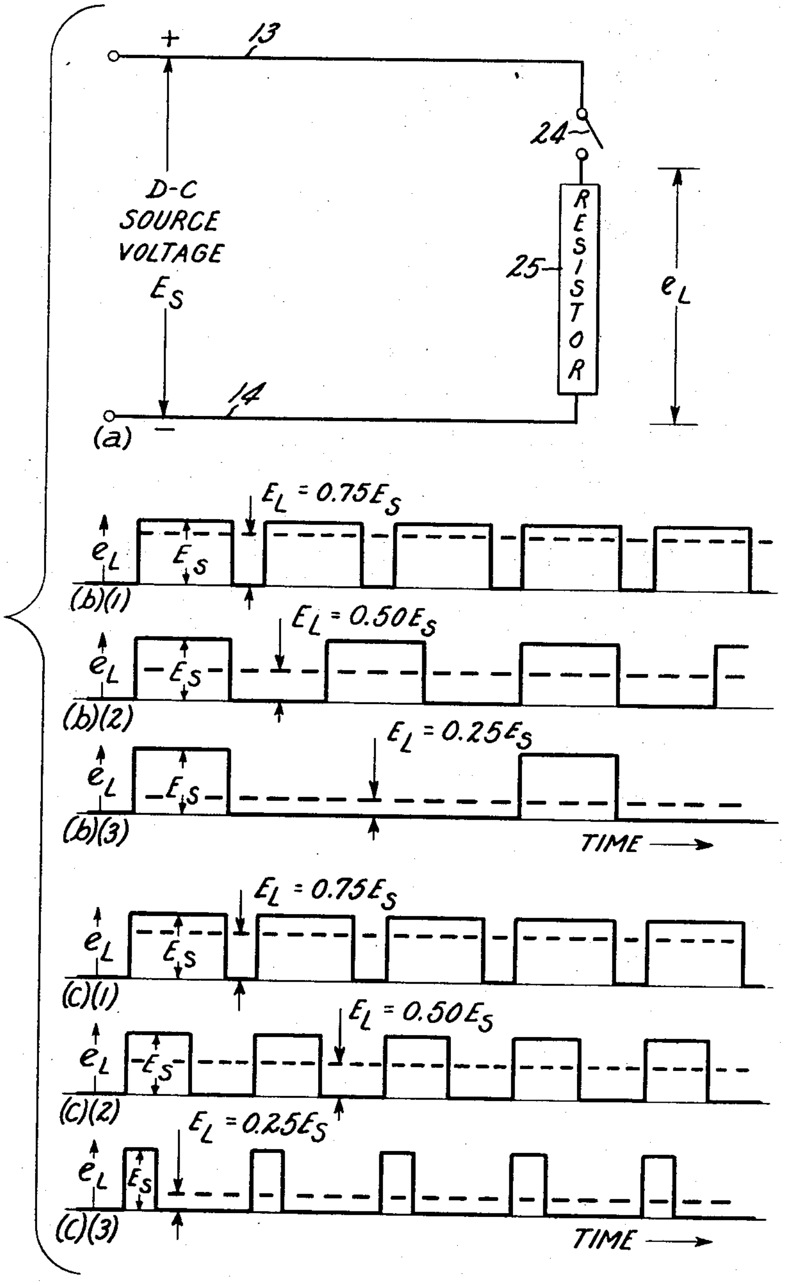
FIG. 2 is an equivalent circuit representation illustrating the time-ratio control principle together with a series of curves depicting the form of variable voltage direct current electric energy derived from time-ratio control power circuits.

The theory of operation of time-ratio power control is best illustrated in FIG. 2 of the drawings wherein FIG. 2(*a*) shows an on-off switch 24 connected in series circuit relationship with a load resistor 25 across a direct current supply $E_s$. With the arrangement of FIG. 2(*a*), there are two possible types of operation in order to supply variable amounts of power to the load resistor 25. In the first type of operation, switch 24 is left closed for fixed period of time and the time that switch 24 is left open can be varied. This type of operation is illustrated in curves 2(*b*), wherein curve 2(*b*) (1) illustrates a condition where switch 24 is left open for only a short period of time compared to the time it is closed to provide an average voltage $E_L$ across load resistor 25 equal to approximately three-fourths of the supply voltage $E_s$ of the direct current power supply. In FIG. 2(*b*) (2) the condition is shown where the switch 24 is left open for a period of time equal to that during which it is closed. Under this condition of operation, the voltage across the load will equal approximately 50 percent of the supply voltage $E_s$. FIG. 2(*b*) (3) illustrates the condition where switch 24 is left open for a period of time equal to three times that for which the switch is closed so that the load voltage. appearing across the load reisstor 25 will be equal to approximately 25 percent of the supply voltage $E_s$. It can be appreciated that by varying the period of time during which switch 24 is left open, the amount of direct current potential applied across load 25 is varied proportionally.

In the ssecond type of operation possible with time-ratio control circuits, switch 24 is closed at fixed times, and the time that the switch is left closed can be varied. This second type of operation of the circuit shown in FIG. 2(*a*) is illustrated in FIG. 2(*c*) of the drawings wherein the amount of time that switch 24 is left closed is varied. In FIG. 2(*c*) (1), the condition where switch 24 is left closed for a much greater period of time than it is open, is illustrated to provide a load voltage $E_L$ of approximately 0.75 $E_s$. In FIG. 2(*c*) (2), the time that switch 24 is left closed equals the time that it is open to produce a load voltage that is equal to 0.5 $E_s$. In FIG. 2(*c*)(3), the condition is illustrated where switch 24 is left closed for a period of time equal to one-third of the time that switch 24 is left open to provide a load voltage equal to 0.25 $E_s$. It can be appreciated, therefore, that by varying the period of time that switch 24 is left closed, the amount of voltage supplied across load resistor 25 can be varied proportionally.

In a similar fashion to that described with respect to switch 24, by varying the period of time that SCR 11 of the circuit shown in FIG. 1 is either in a conducting or nonconducting condition, the power supplied to load 12 can be varied proportionally. It is a matter of adjustment of the phasing of the gating control signals supplied to the control gates of SCR 11 and triac 16 which determines the amount of time that SCR 11 is either conducting or nonconducting. This, of course, in turn, determines the power supplied to load 12 in the manner described with relation to FIG. 2. Usually the amount of time that SCR 11 is in its blocking condition is varied, to provide proportionally controlled power supplied to load 12. Insofar as the principles of commutation to be described hereinafter are concerned, it does not matter which type of operation is employed. The operation depicted by FIG. 2($c$) will help the explanation of pumping power back from the load to the power source described later.

Figure 3:
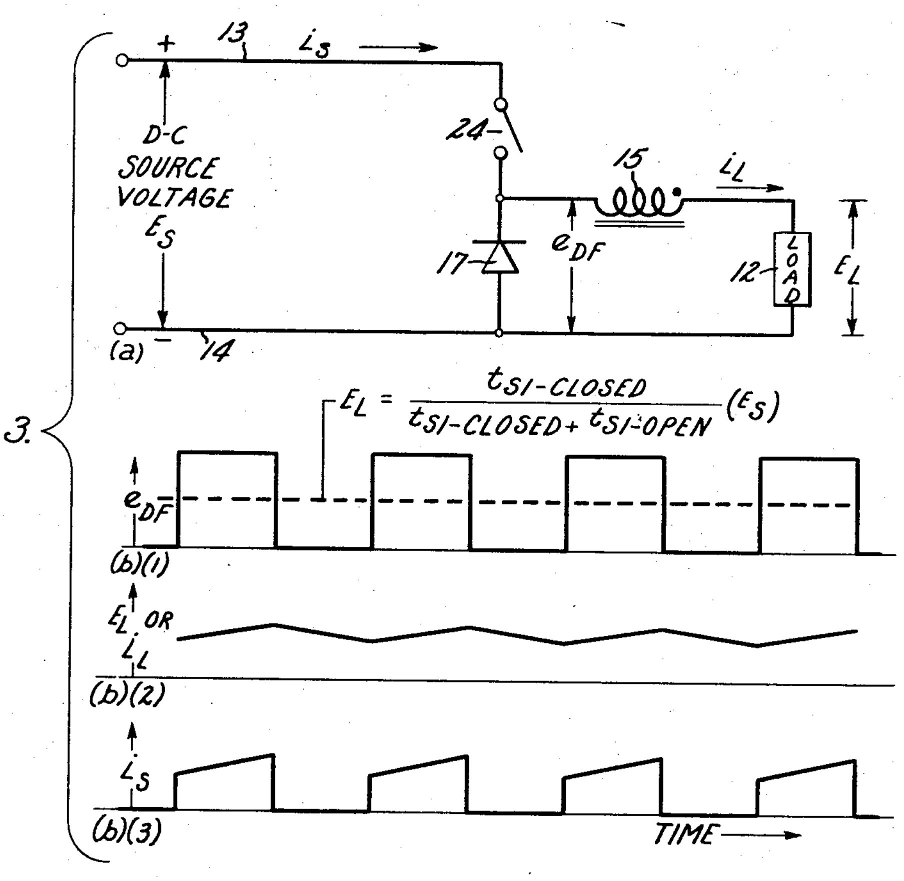
FIG. 3 is an equivalent circuit diagram of a time-ratio control circuit and associated characteristic curves illustrating the effect of a coasting rectifier or non-gate turn off device and filter inductance added to the equivalent circuit of FIG. 2.

FIG. 3 of the drawings better depits the nature of the output signal or voltage $E_L$ developed across load resistor 12 by the circuit shown in FIG. 1. In FIG. 3($a$), SCR 11 is again depicted by the on-off switch 24, and the voltage or current versus time curves for the various elements of this circuit are illustrated in FIG. 3($b$). FIG. 3($b$)(1) illustrates the voltage versus time characteristics of the potential $e_{DF}$ appearing across a coasting diode 17. It is to be noted that the potential $e_{DF}$ is essentially a square wave potential whose period is determined by the timing of switch 24. For the period of time that switch 24 is left closed, a load current $i_L$ flows through filter inductance 15, load 12, and back into the power supply. Upon switch 24 being opened (which corresponds to SCR 11 being commutated off to its blocking or nonconducting condition), the energy trapped in the filter inductance 15 will try to produce a coasting current flow in a direction such that it will be positive at the dot end of the filter inductance. This energy, which is directly coupled across coasting diode 17, causes diode 17 to be rendered conductive and to circulate a coasting current substantially equal to load current $i_L$ through load 12 and coasting diode 17, thereby discharging filter inductance 15. Consequently, the load voltage $E_L$, and for that matter load current $i_L$, will appear substantially as shown in FIG. 3($b$)(2) of the drawings, as an essentially steady state value lower than the source voltage $E_s$ by a factor determined by the timing of on-off switch 24. This load voltage can be calculated from the expression shown in FIG. 3. This expression states that the load voltage $E_L$ is equal to the time that switch 24 is left closed divided by the time that switch 24 is left closed plus the time switch 24 is left open, all multiplied by the power supply voltage $E_s$. The current $i_s$ is supplied from the power supply to switch 24 is illustrated in FIG. 3($b$)(3) and is essentially of square wave form having the same period as the voltage $e_{DF}$. It should be noted that upon the next succeeding cycle of operation when switch 24 is closed, the filter inductance 15 will again be charged in a manner such that when it discharges upon switch 24 being opened, its potential is positive at the dot end so that the coasting rectifier 17 is again rendered conductive and discharges the filter inductance through load 12 to provide the essentially continuous steady state load voltage $E_L$ shown in FIG. 3($b$)(2).

Figure 6:
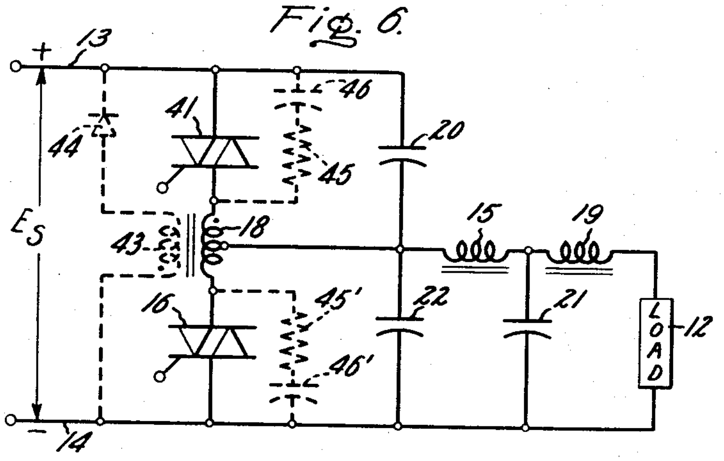
FIG. 6 is a detailed circuit diagram on an all triac version of the circuit shown in FIG. 1 and employes additional circuit improvements.

Returning to FIG. 1 of the drawings, it can be appreciated that the frequency of SCR 11 being switched on and commutated off determines the load voltage $E_L$ supplied across load 12 in the manner discussed in connection with FIG. 3 of the drawings. In order to commutate off the SCR 11, new and improved commutation circuit means comprised by elements 18, 20 and 22 has been provided and is aided by pumpback triac 16. The new and improved commutation circuit operates in the following manner. Assume triac 16 is conducting through inductances 18, 15, 19 and 12 in the direction shown in FIG. 1 as described hereinbefore in connection with FIG. 3 during the coasting phase of operation. During this phase the dot end of capacitors 20 and 22 are near or at the voltage of terminal 14. The SCR 11 is then turned on forcing the current of inductor 18 windings to reverse. Current through triac 16 in the coasting direction then drops to zero and triac 16 is commutated off. Source current $i_s$ flows through SCR 11 and the upper half of inductance 18 to capacitors 20 and 22. Inductance 18 and capacitors 20 and 22 start to oscillate at the desired commutating resonant frequency, and the tap point of inductance 18 as well as the dot ends of capacitors 20 and 22 are each swung substantially above full supply voltage by energy stored in inductor 18. Capacitor 22 then charges substantially to the value of $E_s$ and capacitor 20 is reversed in voltage, positive at the dot end. At this instant triac 16 is turned on in the commutating direction (i.e., inductor 18 side of triac 16 is positive with respect to supply terminal 14). Upon triac 16 being turned on, the triac end of inductor 18 is clamped to the potential of terminal 14. Since the triac end previously had been at the potential $E_s$, current will flow out of capacitor 22 across the lower half of inductor 18. The result is to drive the voltage of the cathode of SCR 11 above the voltage of supply terminal 13 due to autotransformer action in the windings of inductor 18. As a result the voltage across SCR 11 reverses with the juncture of SCR 11 and inductor 18 positive with respect to terminal 13, and SCR 11 remains reversed for the desired commutating time to allow it to turn off. Capacitors 20 and 22 supply the necessary load current to the load current filter inductance 15 during the desired commutating interval of time while SCR 11 voltage is reversed. At this time the exciting current in inductance 18 drops to zero due to the discharge of capacitor 22 and triac 16 turns off. Triac 16 is then turned on again in the coasting direction by the application of a suitable gating signal to its gate such that triac 16 conducts in a direction from the power supply terminal 14 to the triac end of winding 18. In the event that load 12 is open circuit, capacitors 20 and 22 and inductor 18 oscillate by selective turning on of triac 16. This oscillation alternately charges capacitor 22 negative and positive to prevent filter capacitor 21 from charging to excessive voltage. The oscillation is maintained until it is desired to again turn on SCR 11. This condition is also used when the load is a DC motor that is coasting and requires no armature current. In the event that load current is required triac 16 may be described as being in a coasting mode of operation whereby the load current is circulated within the triac-load circuit loop elements 16, 18, 15, 19 and 12. The load current continues to circulate in the triac-load circuit loop due to the energy storage within filter circuit elements 15, 19 and 21 and triac 16 continues to conduct current. The advantage of employing a filter circuit, as shown in FIGS. 1 and 6, is that load current continues to slow through load 12 even though current may have ceased to flow in the triac at which time the triac is commutated off prior to turning on SCR 11. In the event that the filter circuit comprises only the filter inductor 15, it can be seen that the load current is maintained by energy stored in inductor 15 and flows through elements 15, 18 and triac 16 until SCR 11 is again turned on. It can be appreciated that numerous other filter circuits may be employed in the load circuit, for example, the entire filter circuit may comprise an inductive load such as a generator field. However, such filter circuits are well known and thus will not be illustrated. As stated earlier, triac 16 is commutated off due to the absence of current flow therethrough when SCR 11 is rendered conducting again by the application of a gating-on signal to the gating electrode of SCR 11 upon the initiation of a new cycle. The load current may be maintained through load 12 without substantial change in magnitude by sequential turning on and commutation of SCR 11 in the above described manner.

The commutation circuit for SCR 11 herein described provides a means for charging commutating capacitors 20 and 22 to a voltage that exceeds the power supply voltage even in the no load condition of operation. Therefore, the power circuits herein described are assured of commutation which is relatively independent of load from a no load to full load condition of operation.

Figure 4:
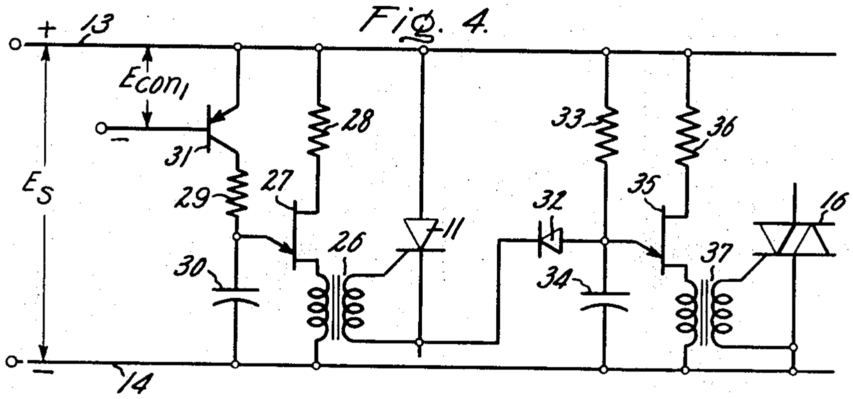
FIG. 4 is a detailed circuit diagram of a suitable gating on circuit for use with the time-ratio control circuit shown in FIG. 1.

FIG. 4 of the drawings illustrates the construction of a gating circuit suitable for use with the new and improved power circuit shown in FIG. 1. In FIG. 4, the load current carrying silicon controlled rectifier device 11 is shown as having its gate electrode connected to the secondary winding of a pulse transformer 26. The primary winding of pulse transformer 26 is connected between one base of a unijunction transistor 27 and the negative terminal 14 of the direct current power supply. The remaining base of the unijunction transistor 27 is connected through a voltage limiting resistor 28 to the positive terminal of the direct current power supply. The emitter electrode of the unijunction transistor 27 is connected to the junction of a resistor 29 and capacitor 30 connected in series circuit relationship between the negative terminal 14 and the collector electrode of PNP transistor 31. The transistor 31 has its emitter electrode connected directly to the positive terminal 13, and its base electrode is connected to a source of direct current control voltage $E_{con_1}$ for controlling the phasing of the time of firing (turning on) of the load current carrying SCR 11.

In order to control the time of firing of commutating circuit aid triac 16 at a fixed phase relationship with respect to the time of firing of the load current carrying SCR 11, the cathode of a blocking diode 32 is connected to the cathode of SCR 11. The blocking diode 32, in turn, has its anode connected to the juncture of a resistor 33 and capacitor 34 connected in series circuit relationship across terminals 13 and 14. The juncture of resistor 33 and capacitor 34 is also connected to the emitter electrode of a unijunction transistor 35 which has one base connected through a resistor 36 to the positive terminal 13, and the remaining base connected through the primary winding of a pulse transformer 37 to the negative terminal 14. The secondary winding of the pulse transformer 37 is connected to the gate electrode of the commutating triac 16.

By reason of the above-described arrangement and nature of the unijunction transistors 27 and 35, which are avalanche devices in that they are rendered fully conducting upon the base to emitter voltage of the device reaching a predetermined level, gating pulses will be produced in the primary windings of the pules transformers 26 and 37 in the following manner: The direct current control voltage $E_{con_1}$ applied to the base electrode of the PNP transistor 31 causes this transistor to vary the value of the resistance of the resistance capacitance network comprised by resistor-capacitor 29 and 30. This results in varying the rate at which the capacitor 30 is charged to a value sufficient to trigger on the unijunction transistor 27. Upon the unijunction transistor 27 being triggered on, a gating pulse will be produced in the secondary winding of pulse transformer 26 which turns on the load current carrying SCR 11. Upon the load current carrying SCR 11 being turned on, the juncture of the cathode of SCR 11 and tapped inductance 18 is driven to the positive potential of terminal 13 so that blocking diode 32 is rendered blocking. Upon diode 32 being blocked, capacitor 34 will be charged up through resistor 33 towards the potential of terminal 13 at a rate determined by the time constant of resistor 33 and capacitor 34. This charging rate can be designed to provide a sufficient potential across capacitor 34 at a predetermined time interval after load current carrying SCR 11 is turned on to cause the unijunction transistor 35 to be turned on. This results in producing a gating pulse in the secondary winding of pulse transformer 37 to thereby turn on commutating aiding triac 16 at the desired fixed interval of time after load current carrying SCR 11 was turned on to allow SCR 11 to conduct and commutate off. This fixed time mode of operation of turning off SCR 11 can also be accomplished by connecting the cathode of blocking diode 32 to the tap point of inductance 18 or to the juncture of inductance 18 and triac 16 instead of the juncture of SCR 11 and inductance 18 as illustrated.

Figure 5:
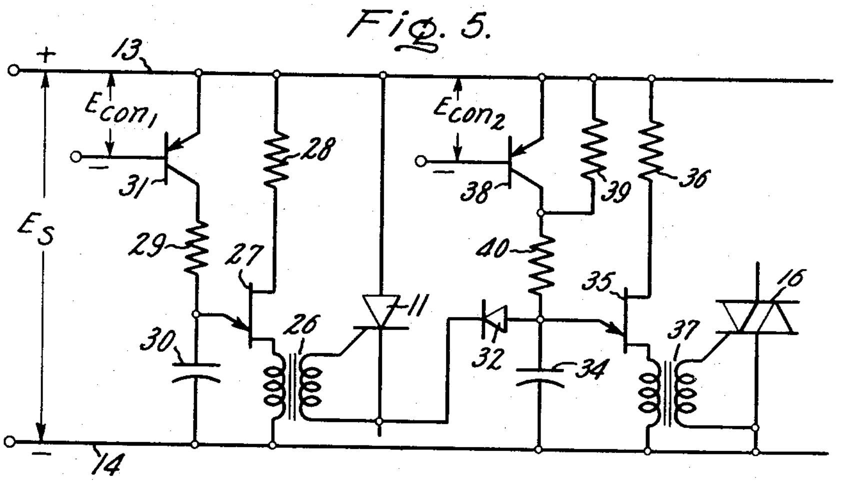
FIG. 5 is a detailed circuit diagram of a modification of the gating circuit shown in FIG. 4 to provide independent control over the commutation and feedback operations, as well as independent control of the turn on of the load current.

FIG. 5 of the drawings illustrates a variation of the circuit shown in FIG. 4 wherein independent control is provided over the firing of the commutating aid triac 16, that is, a variable frequency mode of operation may be obtained. This independent control of the firing of commutating triac 16 is achieved by the substitution of an additional PNP transistor 38 paralleled by a resistor 39 and connected in series circuit relationship with resistor 40 in place of the fixed resistor 33 shown in FIG. 4. By this modification, variation of the conductance of transistor 38, resistor 39, and resistor 40 thereby varies the charging rate of capacitor 34. This, in turn, varies the time at which the unijunction transistor 35 is turned full on resulting in gating on the commutating triac 16 with respect to the turn-on time of the load current carrying SCR 11. If desired, other forms of suitable firing circuits for the power circuit arrangements described may be used, such as those disclosed in chapter 9, entitled "Inverter and Chopper Circuits" of the Silicon Controlled Rectifier Manual, published by the General Electric Company, Rectifier Components Department, copyrighted in 1961.

The output of a power circuit employing the gating circuit shown in FIG. 4 may thus be changed only by varying the frequency of turn on of SCR 11, that is, by changing the magnitude of the direct current voltage $E_{con_1}$. The output of a power circuit employing the cir- shown in FIG. 5, however, may be changed by varying the "on" time or "off" time, or both, by varying the time capacitor 22 voltage exceeds $E_s$ for light loads, thereby permitting a change in the output at either constant or variable frequency, that is, by changing the magnitude of the direct current voltage $E_{con_1}$ and $E_{con_2}$.

FIG. 6 of the drawings illustrates a modification of the time-ratio control power circuit shown in FIG. 1 wherein the load current carrying SCR 11 is replaced by a second gate turn-on, nongate turn-off solid state triac bidirectional conducting device 41 to form an all triac version of the circuit of FIG. 1.

In the FIG. 6 embodiment, an additional winding 43 is tightly coupled to each portion of tapped winding 18 such that inductance 18 which previously functioned as an autotransformer is now a transformer having a tapped primary and a secondary winding all being tightly inductively coupled. Secondary winding 43 is connected in series circuit relationship with a blocking diode 44 and the series circuit formed by the secondary winding 43 and diode 44 is connected in parallel with the series circuit comprised by tapped inductance 18 and two triac devices 41 and 16. The inclusion of secondary winding 43 and blocking diode 44 is preferred for use in conjunction with inductive loads since it is better able to cope with the reactive component of the load current stored in the load circuit. This feature can, of course, be incorporated in the embodiment of the circuit shown in FIG. 1, or in any of the hereinafter illustrated circuits, but for purposes of simplification will not be illustrated in most of the figures. During commutation, the load current is switched from triac 41 to the commutating capacitors 20 and 22 and they become charged and discharged, respectively, to attain their new steady state level in the manner described in relation to the circuit shown in FIG. 1. Thus, triac 41 and for that matter, also triac 16, are commutated off in the same manner as were SCR 11 triac 16, respectively, in FIG. 1.

The operation of the power circuit with a filter inductance 15 included in the load circuit represents a severe condition presented for commutation since with an inductive load circuit is necessary that the commutation capacitors not only perform the operation of turning off the load current carrying device, but in addition, must supply current to the load during a portion of the commutation interval. This is caused by the nature of the inductive load circuit. Thus, during the coasting and pumpback mode of operation of the power circuit, the voltage at the center tap of winding 18 is driven below the negative supply voltage $-E_s$, and, if no protective circuitry was utilized, damage to triacs 16 and 41 and capacitors 20 and 22 would occur if such components were not provided with sufficient voltage rating. The circuit comprising secondary winding 43 and diode 44 provides the protective feature which permits use of triacs and commutating capacitors having lower voltage ratings, thereby providing a lower cost power circuit. In operation, diode 44 is rendered conductive when the tap point of winding 18 drops slightly below the value of the negative terminal voltage of the direct current power supply thereby clamping this point at such voltage and limiting the reverse voltage across triac 41 and capacitor 20 when the circuit operates in the coasting mode, and across triac 16 and capacitor 22 when the circuit operates in the pumpback mode. Thus, the practical effect of the series circuit comprising secondary winding 43 and diode 44 is to limit the negative potential to which the tap point of the inductance 18 may drop.

A series connected resistance-capacitance network 45, 46 may also be connected across triac 41 and a second series connected resistance-capacitance network 45', 46' may be connected across triac 16 to limit the rate of rise of reapplied voltage across such triacs, if desired. The series connected secondary winding 43 and diode 44 and the series connected resistance-capacitance networks 45, 46 and 45', 46' may also be employed with the conventional silicon controlled rectifier device and triac illustrated in FIG. 1 and the other turn-on, nongate turn-off solid state conducting devices to be disclosed hereinafter.

FIG. 7 of the drawings illustrates the circuit shown in FIG. 6 in greater detail. For purposes of illustration, triac 41 may be described as load current gate turn-on, nongate turn-off solid state triac bidirectional conducting device 41. The control gate of triac 41 is connected through a limiting resistor 47 and pulse transformer 48 to a source of control gating-on signal pulses which as one example may comprise the input to pulse transformer 26 in FIG. 4. For a purpose that will be discussed more fully hereinafter, the control gate of triac 41 is also connected to the anode of diode 49 whose cathode is connected through limiting resistor 50 to the positive terminal 13. In addition to these connections, clamping circuit means are provided for clamping off the gate of triac 41 during the commutation of this triac. For this purpose, the control gate of triac 41 is connected to the emitter electrode of an NPN junction transistor 51. The collector electrode of transistor 51 is connected directly to the negative or cathode terminal of the triac device 41, and the base electrode is connected through a limiting resistor 52 to the juncture of commutating capacitors 20 and 22. For the purpose of limiting the rate of rise of reapplied voltage across the triac 41 when it is commutated off, a limiting resistor 45 and series connected capacitor 46, shown in dotted line form, may be inserted between positive terminal 13 and the negative electrode or cathode of triac device 41, if desired. Alternatively, the limiting resistor and series connected capacitor may be employed if triac 41 is particularly susceptible to *dv/dt* firing.

For purposes of simplification, triac device 16 may be described as a coasting and pump back, gate turn-on, nongate turn-off solid state triac bidirectional conducting device. Similar to triac 41, triac 16 likewise has its gate electrode connected through limiting resistor 47' and pulse transformer 48' to a second source of gating control signals which as one example may comprise the input to the primary winding of pulse transformer 37 in FIG. 4 or 5. The control gate of triac 16 is likewise connected through diode 49' and limiting resistor 50' back to the positive terminal or anode of the triac device 16. Further, the control gate of triac 16 is connected to a clamping circuit means comprised by PNP junction transistor 51' whose collector electrode is connected directly to the negative terminal or cathode of triac 16 and whose emitter electrode is connected to the gate of triac 16. The base electrode of transistor 51' is connected through a limiting resistor 52' to the juncture of commutating capacitors 22 and 20. A series connected resistance-capacitance network 45', 46' may be connected across triac device 16 to limit the rate of rise of reapplied voltage across triac 16, if desired. Resistors 53 and 53' are connected between the emitter and base electrodes of transistors 51 and 51', respectively, to prevent turn-on of transistors 51 and 51' except when there is no voltage across capacitors 20 or 22, respectively.

In operation, the circuits of FIGS. 6 and 7 operate similar to the circuit of FIG. 1 in many respects but, in addition, are capable of performing one addional function. That is, the circuits of FIGS. 6 and 7 are capable of operating in a first mode where current is supplied to the load device 12 from the power supply, and also are capable of operating in a second mode where load 12, which for example, might constitute an electric trolley motor coasting down hill, is employed as a generator to pump electric power back into the power supply connected across terminals 13 and 14. The first mode of operation where load 12 is being supplied power from the direct current power supply will be described first.

Assuming that triacs 41 and 16 are each initially in their nonconducting or blocking states, then commutating capacitor 20 is fully charged to essentially the full potential $E_s$ of the direct current power supply by the impedance of load 12. Upon load current carrying triac 41 being gated on by the application of a gating-on signal to the gate thereof from pulse transformer 48, load current flows through triac 41, the upper half of inductance winding 18, the filter circuit and load 12 in precisely the same fashion as the SCR circuit described previously. The junctures of capacitors 20 and 22 rise above the positive power terminal 13 due to oscillatory action of inductor 18 and capacitors 20 and 22. Upon this occurrence, commutating capacitors 20 and 22 charge and discharge, respectively, in a damped oscillatory manner through the load circuit after turning off triac 41 in the manner previously described in connection with FIG. 1. During the oscillatory charge and discharge of commutating capacitors 20 and 22, the dot side of inductor 18 is driven positive with respect to terminal 13 which may tend to produce a gating-on signal on the gate of triac 41 during the commutation interval. However, this positive potential is supplied also through limiting resistor 53 to the base electrode of NPN transistor 51 to cause this transistor to become fully conductive and thereby clamp the gate of triac 41 to the potential of the negative or cathode electrode of triac 41.

The circuits of FIGS. 6 and 7 will now be considered in their second mode of operation, that is, when load 12 might be, for example, an electric trolley car that is coasting down a hill and, hence, generating current. Under these conditions, it is desirable to supply the current generated by load 12 back into the direct current power supply. When operating under these conditions, triac 41, which for this purpose may be designated as the commutating aid and feedback triac is initially in its blocking condition and triac 16, which for this purpose may be designated as the pump back triac is periodically turned on and off by the application of a suitable gating-on signal to the input terminals of pulse transformer 48'. In this second mode of operation of the circuit, triac 16 is rendered conducting in a direction from the triac 16 end of winding 18 to the negative power supply terminal 14, that is, in the same direction as when triac 16 is rendered conducting immediately after commutation of triac 41 in the first mode of circuit operation. When thus turned on, pump back triac 16 will be commutated off by the operation of the commutation circuit means 18, 20, 22 and 41 in the manner previously described in relation to FIG. 1. Each time that triac 16 is gated on, filter inductance 15 will be charged with the current from capacitor 21 and load 12 which in this mode of operation of the circuit is acting as generator, and hence, will be referred to as load generator 12. Upon pump back triac 16 being commutated off, the potential across filter inductance 15 adds to the potential of the load generator 12 and capacitor 21 to drive the potential of the tap point of inductance 18 positive with respect to terminal 13. This causes commutating aid and feedback triac 41 to conduct current in the feedback direction by reason of the application of a gating pulse to the gate electrode thereof by means of the diode 49-resistor 50 circuit and transistor 51 being turned off by the voltage at the dot end of capacitor 20 being substantially below the voltage of terminal 13. Power will then be pumped back from the load generator 12 through filter inductance 15 until such time that the filter inductance 15 is discharged a desired sufficient amount. Then triac 16 is turned on, reversing the current of inductance 18 and commutating off triac 41 in the same manner that SCR 11 commutated triac 16 at the end of the coasting phase of operation of FIG. 1.

This results in reversing the polarity of the potential across triac 41, turning it off, and allowing it to resume its blocking condition. Upon this occurrence, the circuit resumes its original condition thereby completing one cycle of the second mode of operation, and pump back triac 16 remains on in the feedback direction for a desired interval to initiate a new cycle.

A further circuit improvement may be obtained by adding capacitors 104 and 104' shown in dotted line form between the base and emitter electrodes of transistors 51 and 51', respectively. The function of the added capacitors is to maintain transistor 51 or 51' in a conductive state during the interval that oscillations occur after commutation of triac 41 or 16. This feature allows use of higher resistance for resistors 52 and 52', resulting in less current drain on capacitors 20 and 22 and permitting smaller components for resistors 52 and 52'.

From the above description, it can be appreciated that by reason of the bidirectional conducting characteristic of triacs 41 and 16, the circuit of FIG. 7 can be operated in either one or two modes to supply current to a load 12 or to feed current generated by a load generator back to the power source as determined by the conditions of operation of the load. It, therefore, can be appreciated that the circuit of FIG. 7 makes a highly efficient time-ratio control power circuit for use with traction motors, for example, used in driving electrically operated vehicles.

Figure 8:
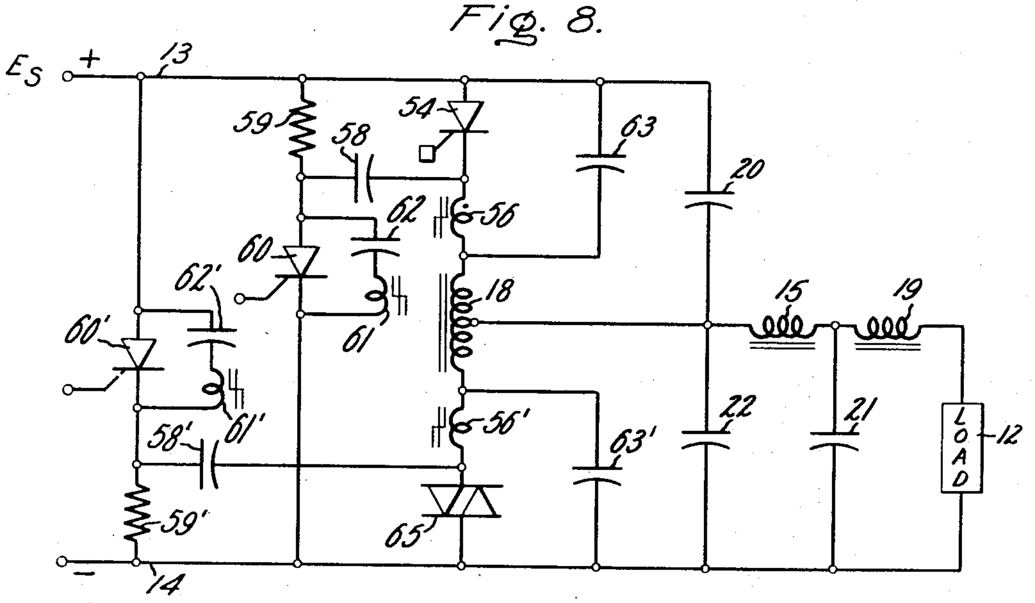
FIG. 8 is a detailed circuit diagram of a new and improved time-ratio control circuit employing *dv/dt* fired devices and a new and improved commutation scheme comprising a part of the invention.

FIG. 8 of the drawings shows a different form of a new and improved time-ratio control power circuit constructed in accordance with my invention. The embodiment of the invention shown in FIG. 8 is similar to the circuit of FIG. 1 and identical insofar as construction and operation of the commutation circuit means and load circuit is concerned, and hence these two components will not be again described. However, in place of the gate turn-on, nongate turn-off solid state silicon controlled rectifier 11 and triac 16 used in the circuit of FIG. 1, a nongate turn-off solid state *dv/dt* fired silicon controlled rectifier 54 and diac 65, respectively, are employed in the circuit arrangement of FIG. 8. The silicon controlled rectifier 54 may be a conventional gate turn-on silicon controlled rectifier wherein the gate is open-circuited. The diac 65 is a nongate turn-on, nongate turn-off solid state bidirectional conducting device, such controlled conducting device being termed a power diac. The power diac is essentially an NPNPN, five-layer junction device capable of conducting currents as large as 100 amperes in either one of two directions through the device, dependent upon the polarity of the potential applied across the device. The power diac is triggered from its blocking or low conductance condition to its high conducting condition by the application of a high *dv/dt* firing pulse across its terminals similar to the *dv/dt* fired SCR 54. It should be noted that the power diac referred to in this application is an entirely different device than its cousin the signal diac which is a low current, three-layer junction device designed to operate in the milliwatt region and used primarily in conjunction with gating circuit applications. For a more detailed description of the power diac device 65, reference is made to an article entitled "Two Terminal Asymmetrical and Symmetrical Silicon Negative Resistance Switches" by R. W. Aldrich and N. Holonyak, Jr., appearing in the Journal of Applied Physics, vol. 30, No. 11, November 1959, pages 1819–1824. A technique known as *dv/dt* firing of the SCR 54 and power diac 65 is employed to render them conducting. For this purpose, the nongate turn-on silicon controlled rectifier 54 and power diac 65 are connected in series circuit relationship with small saturable reactors 56 and 56', respectively. The small reactors each serve a pulse shaping function in that their presence steepens the trailing edge of a square wave firing pulse applied across SCR 54 and diac 65, thereby assuring that the firing voltage is removed from such two-controlled conducting devices as quickly as possible after they turn on. Isolation between the two firing circuits is achieved by means of a pair of isolation capacitors 63 and 63' connected between terminal 13 and the juncture of reactor 56 and inductance 18, and between the juncture of inductance 18 and reactor 56' and terminal 14, respectively.

In order to turn on the open-circuited gate SCR 54 and supply load current to the load 12, firing circuit means are provided which include a pulsing capacitor 58 having one terminal connected to the juncture of the nongate turn-on SCR 54 and the small saturable reactor 56. The remaining terminal of the pulsing capacitor 58 is connected between the juncture of resistor 59 and a small third auxiliary gate turn-on SCR 60 back to the negative terminal 14. The other end of resistor 59 is connected to the positive terminal 13. The third auxiliary SCR 60 has a commutation circuit means comprised by a series connected saturable reactor 61 and commutating capacitor 62 connected in parallel circuit relationship therewith for commutating off the third auxiliary SCR 60 in the manner of a conventional circuit commutation operation. Since only a small (low current rating) auxiliary SCR 60 is required, the components of the firing circuit means likewise can be small and relatively inexpensive.

Similar to open-circuited gate SCR 54, power diac 65 likewise is provided with a firing circuit means comprising pulsing capacitor 58', resistor 59', and a small fourth auxiliary gate turn-on SCR 60'. The commutation circuit means for SCR 60' is in like manner a series connected saturable reactor 61' and commutating capacitor 62' connected in parallel circuit relationship therewith.

In operation, the circuit of FIG. 8 functions in the following manner. The nongate turn-on SCR 54 is in its blocking condition, in which event, pulsing capacitor 58 will be charged to essentially the full potential of the direct current power supply through load 12, the filter circuit, upper half of tapped inductance 18, saturable reactor 56 and resistor 59. This operation will function to drive the saturable reactor 56 into positive saturation so that the potential across it is positive at the dot end. With the circuit in this condition, the third auxiliary SCR 60 is in its blocking condition. At the point in time when it is desired to supply load current to the load 12, a gating on signal is supplied to the gate of the small third auxiliary SCR 60. Upon SCR 60 being rendered conductive, charged capacitor 58 attempts to discharge through the now conducting third auxiliary SCR 60, load 12, filter circuit, upper half of tapped inductance 18, and saturable reactor 56. The saturable reactor 56, however, unsaturates and temporarily holds off the potential of capacitor 58 for a short period of time. As a consequence, the juncture of capacitor 58 and reactor 56, and hence, the cathode potential of SCR 54 is quickly driven to a negative potential substantially double that of the negative bus 14. This results in applying a very steep pulsed square wave shaped potential across the nongate turn-on SCR 54. This very steep pulsed square wave potential provides a very large change in voltage across SCR 54 in a very short time and, thus has a high *dv/dt*. The high *dv/dt* voltage pulse in effect causes an avalanche conduction condition through the nongate turn-on SCR 54, thereby turning it full on almost instantaneously. Thereafter, the saturable reactor 56 is immediately driven back into positive saturation so that the high potential across SCR 54 is immediately removed to avoid possible damage to the SCR 54 and returns the SCR to normal operating conditions. The SCR 54 then continues to conduct and to supply load current to load 12 for a desired interval of time. When it is desired to commutate off the SCR 54, auxiliary SCR 60′ is turned on and renders nongate turn-on power diac 65 conductive as described in relation to the turning on of SCR 54. The conduction of diac 65 operates in the manner described with relation to the circuit shown in FIG. 1 to turn off SCR 54. In the interim, the commutation circuit means 61, 62, associated with the small third auxiliary SCR 60, has turned off SCR 60 and commutation circuit means 61′, 62′ has turned off SCR 60′ so that the circuit is then returned to its initial quiescent condition ready for another cycle of operation. It should be noted that diac 65 functions in precisely the same manner as triac 16 in the arrangement shown in FIG. 1, that is, operates to commutate off SCR 54 or provides a coasting mode of operation whereby load current is circulated within the diac-load loop.

Figure 9:
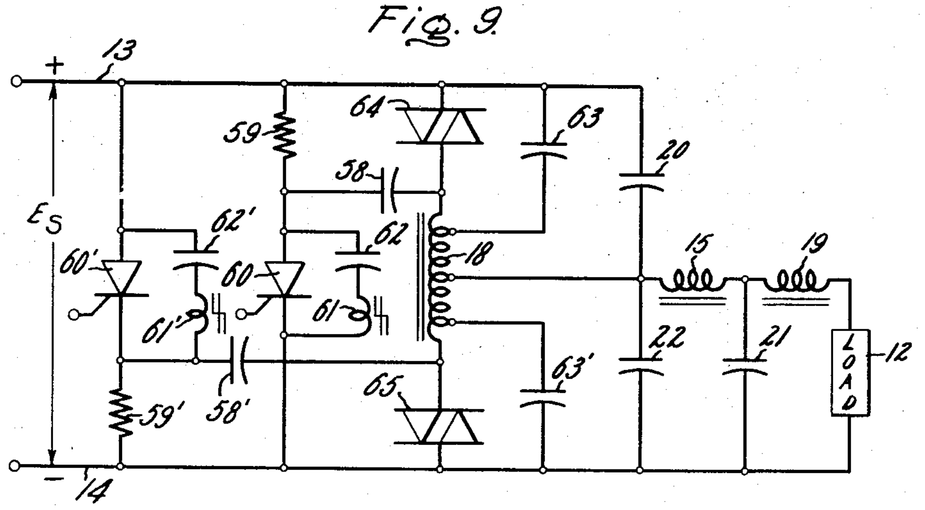
FIG. 9 is a detailed circuit diagram of a modification of the circuit shown in FIG. 8 and employs a bidirectional conducting diac in place of the *dv/dt* fired SCR and, in addition, illustrates a second form of capacitor isolation between the two firing circuits.

FIG. 9 of the drawings illustrates still a different form of a new and improved time-ratio control power circuit constructed in accordance with my invention. Again in FIG. 9, nongate turn-on, nongate turn-off solid state conducting devices 64, 65 are employed; however, in the circuit arangement these controlled conducting devices are both bidirectional conducting power diacs. The embodiment of the invention shown in FIG. 9 is similar to the circuit of FIG. 8 and identical insofar as construction and operation of the firing circuits, commutation circuits, and load circuit are concerned, therefore, these circuits will not be described again in detail. The chief distinction between the circuits of FIGS. 8 and 9, other than the use of power diac 64 for the nongate turn-on SCR 54 is the change in connection of the isolating capacitors 63 and 63′. In the FIG. 9 embodiment, the isolating capacitors are connected at tap points adjacent the two respective ends of tapped inductance winding 18. Such connection permits simplification of the series circuit including diac 64, inductance 18, and diac 65 in that the small saturable reactors 56 and 56′, shown in FIG. 8 are no longer required for proper pulse shaping of the firing pulses. For the particular embodiment of FIG. 9, winding 18 is of different design from the winding employed in the previous embodiments. In the previous figures, winding 18 is tightly coupled and approaches unity coupling. In the FIG. 9 embodiment, the portions of the winding between each end and adjacent tap point, that is, the outer portions as illustrated, having a coupling factor with the inner portions of approximately 0.6 whereas the inner portions are tightly coupled together, approaching unity coupling. The bidirectional conducting nature of power diacs 64 and 65 permits the two modes of operation which are obtained with the circuits illustrated in FIGS. 6 and 7 wherein the load current is supplied to the load or feed back to the power supply.

At this point, it is appropriate to point out advantages in employing the new triac and diac devices in my improved power circuits described herein. Taking as specific examples the circuits illustrated in FIGS. 1, 6 and 8, it can be appreciated that the use of a bidirectional conducting device such as triac 16 or diac 65 in place of a unidirectional conducting SCR device having a diode connected in a reverse polarity sense thereacross permits the use of a far more simple commutation circuit and operation thereof. In particular, the use of a SCR device and diode in place of triac 16 or diac 65 requires the use of what may be described as commutating inductances in series with commutating capacitors 20 and 22. The use of such inductances effectively slows down the rate of change of the potentials across capacitors 20 and 22 such that there is sufficient time to completely commutate off SCR 11 before the dot ends of the capacitors are reduced to the steady state value of $E_s/2$. Such commutating inductances develop an oscillatory current during commutation having a peak value equal to twice the load current in order to commutate off SCR 11. This peak value of commutating current means that four times the normal energy is trapped in the commutating inductances and this increases the magnitude of oscillations after commutation is complete. Further, at the time that the relatively large commutating current stops flowing, a relatively steep *dv/dt* voltage is developed across inductance 18 which may cause SCR 11 to reconduct by *dv/dt* firing.

The use of triacs and diacs overcomes the above limitations of SCR's in the subject power circuits. In particular, the use of a bidirectional conducting device such as triac 16 or diac 65 in place of an SCR-coasting diode combination permits a simplification of the commutation circuit since the commutating inductances may now be omitted. The elimination of such inductances reduces the peak value of the commutation current to the value of the load current, thereby permitting use of smaller commutation circuit components. Further, the absence of excess commutation current flow through the triac or diac devices prevents the inadvertent reconduction of such devices by *dv/dt* firing as in the case of SCR devices. This reconduction causes failure of circuit operation. Thus, after commutation of the diac or triac device is completed, commutating capacitors 20 and 22 do not have a diode circuit through which to discharge and high *dv/dt*, during or after commutation, is prevented and safe operation is assured. The use of the bidirectional conducting devices, diacs, or triacs further reduces the number of circuit components since the functions of a feedback diode in parallel circuit relationship with SCR 11, and a coasting diode are now incorporated in the bidirectional nature of the diacs and triacs. Finally, inductance 18 may be reduced in size since the root mean square current flow therethrough is less than the current flow in the corresponding inductance in the all-SCR circuit herein described. Since the nongate turn-on device diacs and *dv/dt* fired SCR's have lower switching losses than the gate turn-on devices, triacs, or gate turn-on SCR's, when switching such devices to their conducting states, the nongate turn-on devices are especially useful in higher frequency applications.

FIG. 10 of the drawings illustrates still a different form of a new and improved time-ratio control power circuit constructed in accordance with my invention. Again in FIG. 10 as in FIG. 9, nongate turn-on, nongate turn-off solid state conducting power diac devices 64 and 65 are employed. A further simplification of the isolating capacitor circuit shown in FIG. 9 is attained in FIG. 10 by selecting tapped inductance winding 18 having sufficient distributed capacitances $C_{18}$ (shown by dotted line), whereby the separate isolating capacitors 63 and 63′ shown in FIGS. 8 and 9 are no longer required. Winding 18 may be of multilayer design and an overlapping layer on both ends thereof to provide the same relative couplings as winding 18 in FIG. 9. Thus, isolation between the firing circuits for diacs 64 and 65 is achieved by distributed capacitances $C_{18}$ of winding 18 and the pulse shaping function performed by small saturable reactors 56, 56' in the circuit of FIG. 8 is achieved by the end portions of winding 18 as in the case of the circuit of FIG. 9. Commutation circuit means are connected in circuit relationship with power diac devices 64 and 65 for commutating each of them off in sequence and thus returning each to its blocking condition and are comprised by tapped inductance 18 and commutating capacitors 20 and 22. Since these commutation circuit means are identical in construction and operation to the commutation circuit means described with relation to FIG. 1 of the drawings, it will not be described again in detail. Power diacs 64 and 65 may be triggered from their blocking or lower conductance condition to their high conducting condition by employing the high *dv/dt* firing circuit illustrated in FIGS. 8 and 9; however, a different firing circuit will be illustrated with relation to FIG. 10 to disclose still another example of the firing circuits which may be employed with the new and improved time-ratio control power circuits.

In order to turn on the power diac device and render it conductive when the terminal 13 is positive with respect to the tap point of inductance 18, a first load current firing circuit means is provided which is comprised by a pulsing capacitor 66 connected in parallel circuit relationship with a resistor 67 and a snap action switch turn-on controlled conducting means 68. This snap action turn-on controlled conducting means may comprise a smaller rated signal diac device mentioned above, a Shockly diode, or one of the bidirectional low current rated diode, or one of the bidirectional low current rated diode devices manufactured and sold by the Hunt Electric Company and known as a Hunt diode. The snap action switch 68 is similar to the diac device 64 in many of its characteristics; however, it will break down in an avalanche manner and be rendered fully conductive as long as current through switch 68 exceeds 50 milliamperes upon the application of a sufficiently high potential across the device. When thus fired, the rate of buildup of the firing potential, that is, its *dv/dt,* is not important. The snap action controlled conducting device 68 is connected in series circuit relationship with resistors 68 and 69 and diode 70. The series circuit thus comprised is connected between terminal 13 and the juncture of diac 64 and inductance winding 18. A coupling capacitor 71 is connected in parallel circuit relationship with snap action device 68, resistor 69, and diode 70. A PNP junction transistor 72 is connected in series circuit relationship with resistor 73 across pulsing capacitor 66. By this arrangement, conduction through the PNP junction transistor 72 controls the rate of voltage buildup across the pulsing capacitor 66. With transistor 72 turned full on, the voltage on capacitor 66 never builds up to a value sufficient to trigger on the snap switch device 68. By varying the rate of conduction through transistor 72, the rate of voltage buildup on the pulsing capacitor 66 can be controlled to control the point at which the snap switch device 68 is switched full on. Upon the snap switch device 68 being switched full on, the charge on capacitors 66 and 71 is connected in series circuit relationship between terminal 13 and the juncture of diac 64 and winding 18, driving such juncture quickly negative with respect to terminal 13. This results in the production of a sharp voltage pulse having a high *dv/dt* across power diac device 64. As a consequence, power diac device 64 is turned on and conducts load current to load 12.

In addition to capacitors 66 and 71 and snap switch 68 and their associated components, the firing circuit means for power diac device 64 includes a second feedback firing circuit means for turning on diac device 64 in a reverse direction. This occurs when the polarity of the potentials of terminal 13 and the juncture of diac 64 and winding 18 are reversed so that the juncture point is more positive than terminal 13 as to cause diac 64 to conduct in the feedback direction in a pump back mode of operation as described with relation to the circuit arrangements shown in FIGS. 6, 7 and 9.

The second firing circuit means for diac 64 is similar in construction and operation to the first firing circuit for diac 64 and for this reason the elements of the second firing circuit means have been given the same reference numeral as corresponding elements of the first firing circuit means. However, diac 65 is also provided with a first and second firing circuit means, each of which is similar in construction and operation to the firing circuit means associated with diac 64. Therefore, departing from the convention heretofore established, in order not to get too many primes after a numeral, the numerals of the second firing circuit means associated with diac 64 have been identified by a prime, the numerals of the first firing circuit means associated with diac 65 have been identified by a letter *f* after them in order to indicate that they control turning on diac 65 during the power feedback mode of operation, and the numerals of the second firing circuit means associated with diac 65 have been identified by a letter *c* in order to indicate that they control turning on diac 65 during the first mode of operation when power is supplied from the direct current power supply to load 12 and diac 65 serves as coasting diode function. The second or feedback firing circuit means associated with diac 64 is comprised by pulsing capacitor 66', snap switch 68', resistor 67', capacitor 71', resistor 69', and diode 70', all of which are similarly arranged and function in precisely the same manner as the identical numbered elements of the first load current firing circuit. The second feedback firing circuit differs from the first firing circuit, however, in the inclusion of NPN junction transistor 74 which is connected in a parallel circuit relationship with capacitor 66' and has its base electrode connected to the juncture of a resistor voltage divider network. This resistor voltage divider network is comprised by a pair of resistors 75 and 76 connected in series circuit relationship across the commutating capacitor 20. Resistor 53 is connected between the collector and base electrode of transistor 74 to turn on transistor 74 when the voltage at the dot end of capacitor 20 is near the voltage of terminal 13. By this arrangement, as long as the potential on the dot side of commutating capacitor 20 is negative with respect to terminal 13, the NPN junction transistor 74 will be maintained full off so that the second firing circuit comprised in part by the pulsing capacitor 66' can turn on the power diac 64 in the reverse or feedback current direction when the polarity of the potentials at terminal 13 and the juncture of diac 64 and winding 18 (hereinafter juncture point 79) are reversed. For example, juncture point 79 becomes more positive than terminal 13 where there is motor load 12. Under such conditions, the diode 70' will break down and conduct and charge pulsing capacitor 66' to a level such that it turns on the snap switch device 68'. This produces a sharp voltage pulse in the previously described manner across power diac 64, thereby turning it on in a reverse or feedback current direction. The power diac 64 will continue to conduct in this direction until the potential at juncture point 79 drops to a valve which is less positive than the potential of the terminal 13 whereupon the power diac device 64 shuts off automatically because of the reversal of potential across its terminals. However, it should be noted that while power diac 64 is conducting in the load current direction during the commutation interval when the potential across commutating capacitor 20 is such that the dot side of the commutating capacitor is near the voltage of terminal 13, the NPN junction transistor 74 will be turned on full by resistor 53 so as to shunt the capacitor 66' and prevent the second firing circuit from turning on the diac 64 during the commutation interval.

The power diac 65 has a first firing circuit means connected thereacross, which is similar in construction and operation to the first firing circuit for power diac 64 and, hence, employs similar elements functioning in the same manner. For example, the pulsing capacitor **66*f* for the coasting and feedback diac 65 corresponds to the pulsing capacitor 66 for the load current carrying diac 64. While operating the circuit in the feedback of power mode of operation, diac 65 is turned on by the firing circuit comprising elements 66*f* through 71*f*, NPN junction transistor 77 and resistor 73*f*. During the first mode of operation of the circuit when power is being supplied from the direct current power supply to load 12, diac 65 must serve a coasting diode function. To operate diac 65 in this manner, a second firing circuit means is provided. The second firing circuit is similar to the second firing circuit associated with the load current carrying diac 64 for turning on diac 65 at appropriate intervals to serve a coasting function and comprises elements 66*c* through 71*c*, PNP junction transistor 78, and resistors 53*c*, 75*c*, and 76*c***.

There is one distinction, however, in the construction of clamping transistor 78 for clamping the potential of the pulsing capacitor **66*c* during the commutation interval when the voltage on the commutating capacitor 22 goes negative at the dot side of the capacitor. Because the potential on the commutating capacitor is negative at this point in the commutation interval, it should be noted that the transistor 78 is a PNP transistor in place of the NPN transistor 74 used in the second firing circuit associated with diac 64**. In all other respects, the two second firing circuit means are constructed identically and operate in the same manner.

Having described the construction of the FIG. 10 circuit arrangement, its operation is as follows: Consider first that the circuit is in its quiescent condition where diacs 64 and 65 are both in their blocking condition and that the circuit is to be operated in the first mode of operation wherein load current is supplied to load 12. Diac 64 is rendered conducting in the following manner. With power diacs 64 and 65 initially being in their nonconducting or blocking condition, capacitor 71 will be charged to the full potential $E_s$ of the direct current power supply 13 through load 12, inductance 18, and resistor 67. Capacitor 66 will be similarly charged through load 12, inductance 15, upper half of inductance 18, diode 70, and resistor 69. During the previous operational cycle, the commutating capacitor 20 will have been charged also to essentially the full potential of the direct current power supply. With the circuit in this condition, a control potential $E_{con_1}$ applied to the base of the PNP junction transistor 72 is adjusted so as to allow the potential buildup across capacitor 66 to increase at a rate such that snap switch 68 is closed or rendered conducting at a desired point in time determined by the load power to be delivered in accordance with the time-ratio control principles previously discussed with respect to FIGS. 2 and 3. Thereafter, the two capacitors 66 and 71, which at this point are effectively in series circuit relationship across diac 64 by reason of snap switch device 68 being turned on, produce a sharp firing pulse having high $dv/dt$ across diac 64 causing it to conduct. Load current will then be supplied to load 12 from the direct current power supply for as long as the power diac 64 is allowed to conduct in the load current direction. The period of load current flow to the load is determined in accordance with the above-mentioned time-ratio control principles.

Just prior to the time that diac 64 is to be rendered non-conducting, a control potential $E_{con_2}$ is applied to the base of an NPN junction transistor 77 which then operates to cause diac 65 to conduct in the same manner as described above in relation to initiation of conduction of diac 64. The conduction of diac 65 operates in the manner described with relation to FIG. 1 of the drawings to commutate off diac 64. During the commutation interval at the time that the charge on the commutating capacitor 20 is low so that its potential at the dot side is near the potential of terminal 13, and juncture 79 is positive with respect to terminal 13, clamping transistor 74 will be turned full on so as to shunt capacitor 66′ thereby preventing the second firing circuit from turning on diac 64 during the commutation interval as previously described in FIG. 7 for transistor 51. Here transistor 74 clamps capacitor 66 in the same manner that transistor 51 clamps the gate of triac 41.

Diac 65 is next turned on in a reverse or coasting direction to function as a coasting diode, diac 65 being turned on by its second firing circuit comprised by elements **66*c* through 71*c*, and PNP transistor 78 which is full off by means of resistors 53*c*, 75*c*, 76*c*. Commutation-off of diac 65 in its coasting direction is accomplished by turning on diac 64** as previously described for the start of the next cycle of operation.

Having described the circuit of FIG. 10 in operation with relation to its first mode of operation, it will now be described under conditions where load 12 might be an electrically driven vehicle which is coasting down hill and, hence, is acting as a generator. Under these conditions, it is assumed that both diacs 64 and 65 are initially in their nonconducting or blocking state, and that the potential of the juncture point 79 tends to go positive with respect to terminal 14. Thereafter, at some predetermined rate determined by the amount of power to be pumped back to the direct current power supply, a control signal $E_{con_2}$ applied to transistor 77 turns on the first firing circuit means associated with coasting and pump back diac 65 to cause it to be turned on in the pump back direction which is opposite to the coasting direction. During turn-on, the lower end of winding 18 serves as a pulse shaping function to protect diac 65. Turning on of diac 65 immediately drops the potential of juncture point 79 to the potential of terminal 14 so that the load generator starts to charge filter inductance 15 in a direction such that the potential across it is positive at the dot end. After inductance 15 is fully charged, diac 65 is commutated off by the commutation circuit means comprised by capacitors 20, 22, inductance 18, and the turning on of diac 64, as previously described for commutating diac 64. During this commutation interval, transistor 78 clamps the potential across capacitor **66*c*** to thereby prevent the application of a firing pulse to the diac during the commutation operation.

Upon diac 65 being commutated off during each operating cycle, the potential of the juncture point 79 rises to above the potential of the direct current power supply due to series addition of the energy of the filter inductance 15 and load generator 12. As a consequence, load current carrying diac 64 is turned on by its second firing circuit when diode 70′ turns on the snap switch 68′, thereby turning on diac 64 to conduct current in its feedback direction. Current is then pumped back into the direct current power supply for the period of time that juncture point 79 remains as high as the potential $E_s$ of terminal 13. At the time that the juncture point 79 drops below the potential of terminal 13, diac 64 is automatically commutated off and returns to its blocking condition thereby readying the circuit for a new cycle of operation. It should be noted that diacs 64 and 65 are essentially avalanche operated devices in that when they are turned on by $dv/dt$ firing in the above-described manner, they are rendered fully conducting across their entire cross section and thereby have lower switching losses than triacs. For this reason, diacs 64 and 65 are capable of operating at higher frequencies than the triac devices. For high frequency operations, the circuit of FIG. 10 may be preferred over the circuit of FIG. 7.

Figure 11:
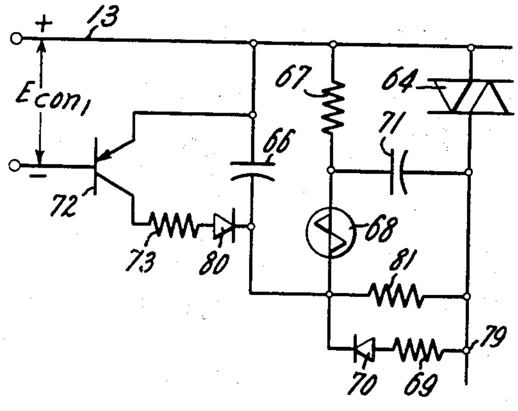
FIG. 11 is a detailed circuit diagram of still a different form of firing circuit means for turning on a diac which uses common circuit elements to turn on the diac to conduct current in either one of two opposite directions.

FIG. 11 of the drawings shows a different form of firing or turn-on circuit for use with a time-ratio control power circuit of the type shown in FIG. 10, for example, wherein the number of components is greatly reduced. In the circuit arrangement of FIG. 11, the single circuit shown provides the turn-on functions for turning on the power diac 64 to cause it to conduct in either of the two directions. This simplification is achieved by the addition of a blocking diode 80 connected in the circuit branch of the PNP junction transistor 72 including resistor 73. Additionally, a charging resistor 81 is provided between the juncture point 79 and capacitor 66 with the connection of diode 70 being reversed so that its negative electrode or cathode is connected to the juncture of the snap switch device 68 and capacitor 66, and its positive electrode or anode is connected through resistor 69 to the juncture point 79. By this arrangement, when the terminal 13 is positive with respect to the juncture point (terminal) 79, the firing circuit functions in precisely the same manner as the first firing circuit described with relation to FIG. 10 to cause the diac 64 to conduct current in what shall be termed the load current carrying direction from terminal 13 through the diac to terminal 79. When the polarities of terminals 13 and 79 are reversed so that terminal 79 is more positive than terminal 13, this positive potential will be transmitted through diode 70 to cause the capacitor 66 to be charged up at a rate determined by the time constant of capacitor 66 and resistor 69. During this occurrence, the blocking diode 80 will block the potential from being applied to the junction transistor 72. Thereafter, upon capacitor 66 reaching a sufficient voltage level, snap switch device 68 is turned on, and capacitors 66 and 71 will be effectively connected in series circuit relationship across diac 64. This produces a sharp voltage rise across diac 64 causing it to turn on and conduct a reverse or feedback current from terminal 79 through the diac to terminal 13.

Figure 12:
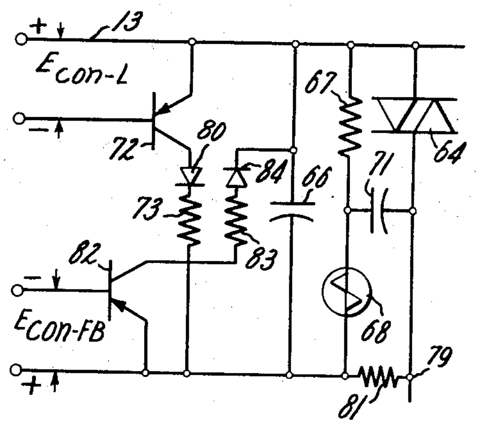
FIG. 12 is a modification of the circuit shown in FIG. 11 which provides independent control of the turn-on of the bidirectional conducting diac in either direction.

It should be noted that the firing circuit of FIG. 11 as well as the firing circuit of FIG. 10 both provide independent control over the time of turning on the power diac 64 in the forward direction only as determined by application of the control signal $E_{con_1}$. There is no independent control over the timing of turning on the diac 64 in the reverse or feedback direction, however, since this occurs automatically whenever the voltage at juncture point 79 goes positive with relation to the terminal 13 unless blocked. In some applications, it may be desirable to independently control the timing of reverse of feedback current flow thorugh power diac 64. For this purpose, the firing circuit of FIG. 12 is provided. The firing or turn-on circuit of FIG. 12 includes the resistor 67 and snap switch device 68 as well as the pulsing capacitor 66. In addition, the PNP junction transistor 72, resistor 73, and diode 80 are provided as well as resistor 81. It should be noted that in the embodiment of the firing circuit shown in FIG. 12, resistor 81 may very well have a different value from the resistor 81 of the FIG. 12 circuit. However, it serves the same function, and hence, has been given the same reference numeral. In the FIG. 12 circuit, resistor 81 serves to couple the pulsing capacitor 66 across diac 64 and, hence, must have a value as small as possible so as not to dissipate this charge or to affect to a great extent the steepness of the applied potential developed across diac 64. In addition to these elements, an additional PNP junction transistor 82 has its collector connected through resistor 83 and diode 84 to terminal 13, and its emitter connected to the juncture of snap switch device 68 and resistor 81. Diode 84 has its negative electrode or cathode connected to terminal 13 and its positive electrode or anode connected to resistor 83. By this arrangement, conduction through either the junction transistor 72 or the junction transistor 82 controls the rate of buildup of voltage across the capacitor 66 and, hence, the time of firing of the snap switch device 68. Depending then upon the relative polarity of terminals 13 and 79, either one of the junction transistors 72 or 82 controls the time of firing of the circuit to thereby independently control the turning on of the power diac 64 in either direction. Thus, application of a control signal $E_{con\text{-}L}$ to the base of transistor 72 turns on the power diac 64 in the forward or load current carrying direction, and application of a control signal $E_{con\text{-}FB}$ to the base of transistor 82 turns on diac 64 in the reverse or feedback direction. It should be noted that while the circuits of FIGS. 10 through 12 have been disclosed for use in conjunction with power diacs, they may be used also to trigger on *dv/dt* fired SCR's. However, when thus used, they would not employ the reverse current firing feature.

Figure 13:
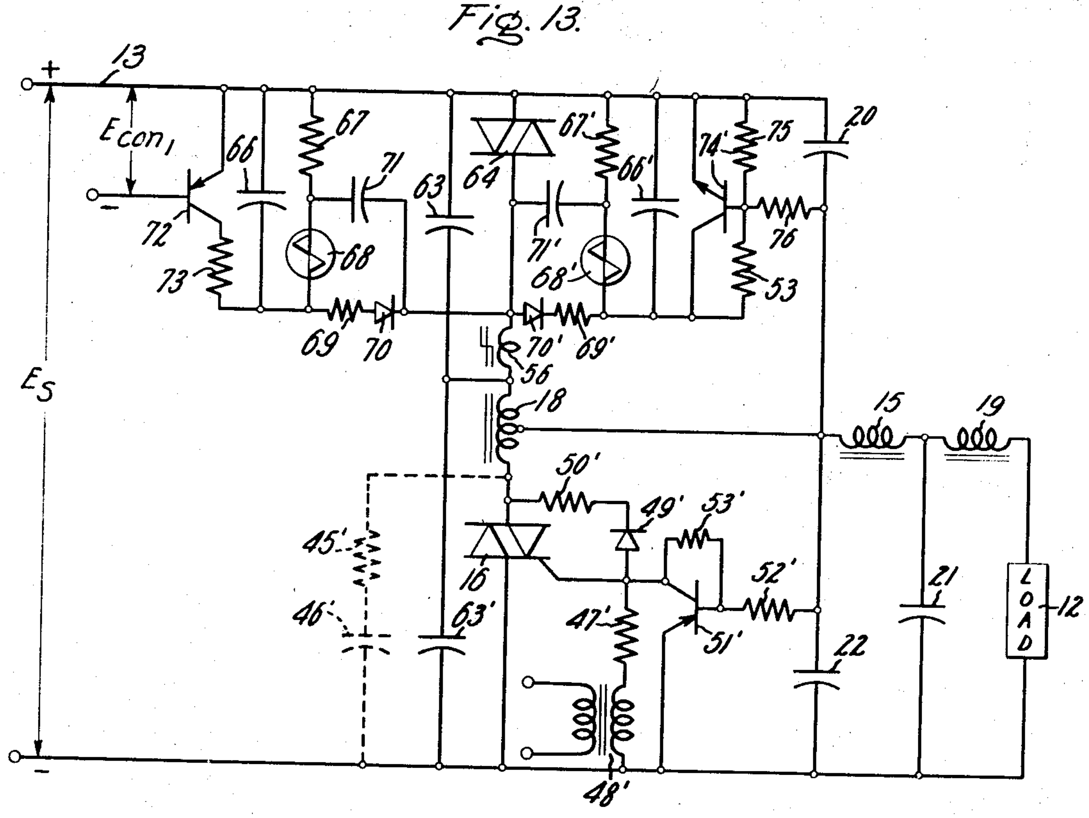
FIG. 13 is a modification of the time-ratio control power circuit shown in FIG. 10 wherein a bidirectional conducting triac is substituted for one of the diacs of FIG. 10.

FIG. 13 of the drawings illustrates still a different form of a new and improved time-ratio control power circuit constructed in accordance with the invention. The circuit shown in FIG. 13 is in many respects similar to the time-ratio control power circuit shown in FIG. 10 in that it employs a load current carrying turn-on, nongate turn-off power diac bidirectional conducting device 64 together with its associated firing circuitry and commutation circuit means. The circuit of FIG. 13 differs, however, from the FIG. 10 circuit in that it employs a coasting and feedback gate turn-on, nongate turn-off triac bidirectional conducting device 16 in place of the coasting and feedback diac device 65 used in the FIG. 10 circuit. The coasting and feedback triac device 16 shown in FIG. 13 includes gating circuit means comprised by elements 47′ through 53′, and commutation circuit means comprised by elements 18, 20 and 22 which are similar in construction and operation to the similar means described with relation to the circuit of FIG. 7 and, hence, will not be described again in detail. If desired, or if required because of the *dv/dt* characteristics of triac 16, a circuit comprised by dotted resistor 45′ and dotted capacitor 46′ may be connected across the coasting and feedback triac 16 to limit the rate of rise of reapplied voltage across the device and thereby avoid undesired turning on of the device. Additionally, it should be noted that isolating means comprised by capacitors 63 and 63′ are included in the circuit arrangement of FIG. 13 to minimize cross coupling between the load current carrying diac 64 and the coasting and feedback triac 16. In view of the fact that the operation of the load current carrying bidirectional conducting power diac 64 and the operation of the coasting and feedback bidirectional conducting triac 16 previously have been described in detail in connection with other time-ratio circuits herein disclosed, their operation in the circuit combination shown in FIG. 13 is believed to be obvious and a further description is thought unnecessary.

Figure 14:
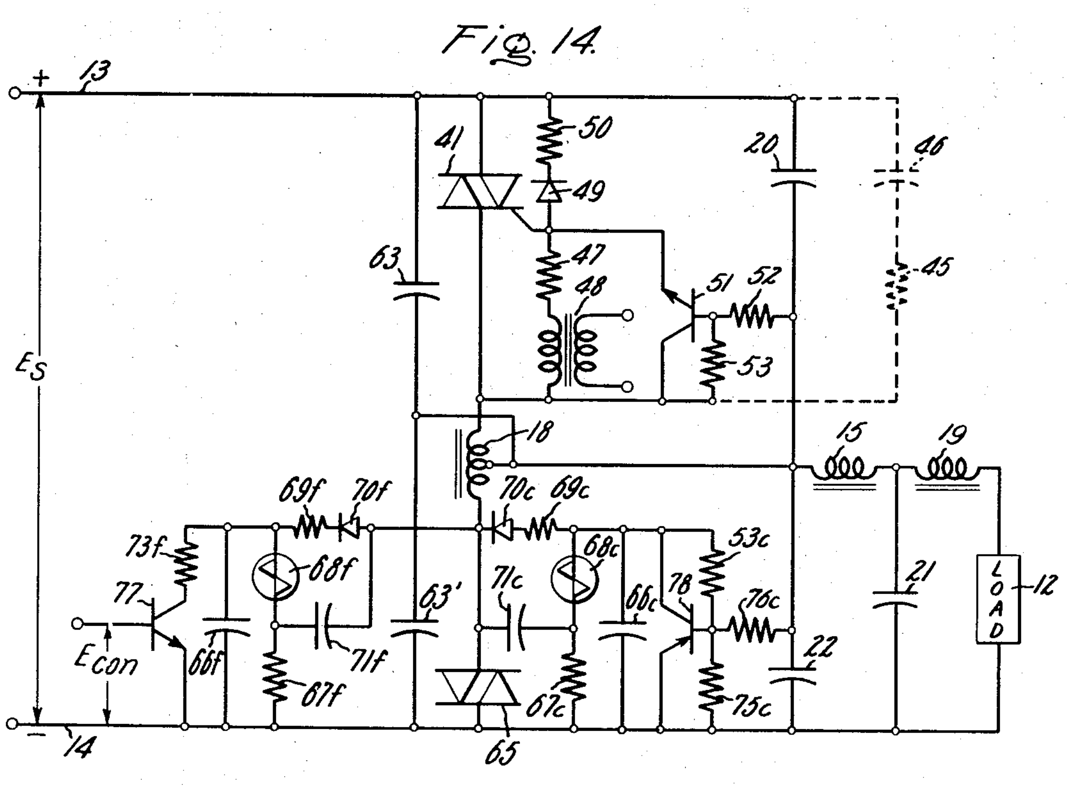
FIG. 14 is a modification of the time-ratio control power circuit shown in FIG. 7 wherein a bidirectional conducting diac is substituted for one of the triacs of FIG. 7.

FIG. 14 of the drawings shows still a different form of time-ratio control power circuit constructed in accordance with the invention. The circuit shown in FIG. 14 is in many respects similar to the circuit shown in FIG. 7 with the exception that a coasting and feedback power diac bidirectional conducting device 65 is employed in the FIG. 14 circuit arrangement in place of the coasting and feedback triac 16 used in the FIG. 7 circuit. In the FIG. 14 circuit arrangement, the load current carrying bidirectional conducting triac 41 employs the same gating and commutation circuit elements and operates in precisely the same manner as the load current carrying bidirectional conducting triac device 41 described with relation to FIG. 7. The coasting and feedback bidirectional conducting power diac 65 of FIG. 14 employs the same circuit elements in its firing and commutation circuit means and operates in the same manner as the coasting and feedback diac device 65 employed in the circuit of FIG. 10. In the light of the previous detailed description of the operation of both the load current carrying triac device 41 and the feedback and coasting diac device 65, their cooperation in the circuit configuration of FIG. 14 is obvious and a further description thereof unnecessary.

Figure 15:
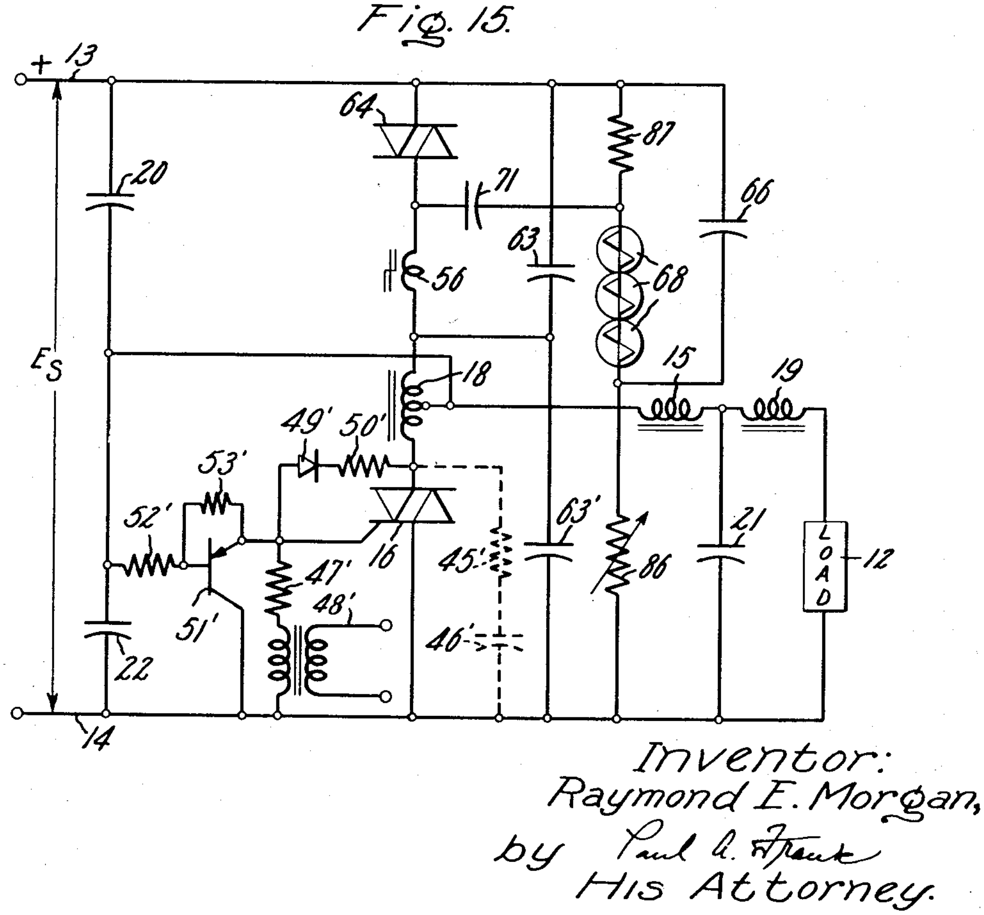
FIG. 15 is a modification of the time-ratio control power circiut shown in FIG. 7 wherein diac is substituted for one of the triacs of FIG. 7 and, in addition, illustrates a different form of firing circuit for diacs and *dv/dt* fired SCR's.

FIG. 15 of the drawings illustrates still another form of time-ratio control power circuit constructed in accordane with the present invention. The power circuit shown in FIG. 15 is in many respects similar to the time-ratio control circuit described with relation to FIG. 7, but differs therefrom in that it employs a diac 64 in the place of the load current carrying triac bidirectional conducting device 41 employed in the circuit arrangement of FIG. 7. The commutation circuit means comprised by the commutating capacitors 20, 22 and tapped inductance 18 operates to commutate off diac 64 in precisely the same manner as the commutation circuit scheme first described with respect to FIG. 1 of the drawings and, hence, will not be described again in detail.

The firing circuit employed to turn on diac 64 is comprised by a pulsing capacitor 66 connected to the juncture of a variable resistor 86 and a plurality of series connected snap action controlled conducting devices 68. The snap action controlled conducting devices 68 may comprise low current rated signal diacs, Shockley diodes, or some similar fast-acting control conducting device connected in series circuit relationship with the variable resistor 86 and a fixed resistor 87 between the power supply terminals 13 and 14. The juncture of the fixed resistor 87 and the snap action control conducting devices 68 is coupled through a coupling capacitor 71 to a first terminal of diac 64 with the second terminal thereof being connected to the positive terminal 13. By this arrangement, when the capacitor 66 has built up a sufficient charge determined by the setting of the variable resistor 86, the snap action control conducting devices 68 are rendered fully conducting thereby effectively connecting capacitor 66 and capacitor 71 in series across diac 64. This results in sharply dropping the potential of the first terminal of diac 64, thereby causing it to be turned full on in the load current carrying direction.

The coasting and feedback triac bidirectional conducting device 16 of FIG. 15 employs precisely the same elements in its gating circuit means comprised by components 47' through 53', and its commutation circuit means, as does the coasting and feedback triac device 16 in the circuit arrangement of FIG. 13. Hence, this device operates in precisely the same manner as was described with relation to FIG. 7 or 13. If desired, a rate of reapplied voltage rise limiting circuit comprised by the dotted resistor 45' and dotted capacitor 46' may be connected across triac 16 to avoid misfiring of this device at the time that the diac 64 is turned on. In order to protect the diac 64, a small saturable reactor 56 may be connected in series circuit relationship with the device. In addition, in order to avoid intercoupling between the load current carrying diac 64 and the coasting and feedback triac 16, isolating capacitors 63 and 63' may be provided in the manner similar to the circuits described with relation to FIG. 13. Since the operation of the diac 64, together with its firing and commutation circuit means, has been described previously in connection with FIGS. 8 and 10 of the drawings, and the construction and operation of the coasting and feedback triac 16, together with its gating circuit means and commutation circuit means, has been described fully in connection with FIG. 7 of the drawings, their cooperation in the circuit combination shown in FIG. 15 is believed obvious and further description thereof unnecessary.

At this point, it is appropriate to review the time-ratio control power circuits hereinbefore described. The use of the simplified commutating circuit employing capacitors 20, 22 and winding 18 requires that the means for initiating commutation of the load current carrying device (SCR 11, triac 41, *dv/dt* SCR 54, or diac 64) be a bidirectional controlled conducting device such as a power diac 65 or triac 16. A first mode of circuit operation whereby electric power is supplied to load 12 from a power supply connected to terminals 13 and 14 may be obtained by employing as the load current carrying device, a unidirectional controlled conducting device such as conventional SCR 11 or *dv/dt* fired SCR 54, or a bidirectional device such as triac 41 or diac 64. A second mode of circuit operation whereby electric power if fed back from load 12 to the power supply may be obtained by employing as the load current carrying device a bidirectional triac 16 or diac 65. Series resistor-capacitor circuits 45, 46 may be employed in parallel circuit relationship with gate turn-on, nongate turn-off controlled conducting devices (conventional SCR or triac) for limiting the rate of rise of reapplied voltage of such devices and thereby prevent *dv/dt* firing thereof. In the case of nongate turn-on, nongate turn-off controlled conducting devices (diacs, *dv/dt* SCR's, or any combination thereof) isolating capacitors 63, 63' may be connected between the power supply terminals 13, 14 and tapped inductance 18 for preventing interference with the operation of a second such conducting device upon a triggering on of a first such fired device. Also, small saturable reactors 56, 56', may be employed intermediate the conducting devices and tapped winding 18 for shaping a suitably steep high *dv/dt* pulse to insure triggering on of diacs or *dv/dt* fired SCR's having their gates open-circuited. Finally, a series circuit comprising a secondary winding 43 inductively coupled to tapped inductance 18 and a blocking diode 44 may be connected between the power supply terminals 13 and 14 for limiting the reverse voltage across the load current carrying device and capacitor 20 when the circuit operates in the coasting mode, and across the other device and capacitor 22 when the circuit operates in the pump back mode. In the case of gate turn-on devices, the firing circuit therefor may be of the type illustrated in FIGS. 4, 5, or 7. In the case of *dv/dt* fired turn-on devices, the firing circuit may be of the type illustrated in FIGS. 8, 10, 11 or 12. Thus, the time-ratio control power circuit constructed in accordance with the invention can be comprised of virtually any combination of individual circuit combinations disclosed in the prior figures herein.

FIG. 16 of the drawings illustrates a new and improved circuit construction in accordance with the invention which is adapted to be operable as either a time-ratio control power circuit or a single phase power inverter circuit, the particular circuit operation obtained being dependent upon the particular sequence of firing of the turn-on, nongate turn-off solid state conducting devices employed in the circuit. In particular, the circuit illustrated in FIG. 16 may be employed as a time-ratio control power circuit as shown in FIGS. 8 and 9 of the drawings and operates in the same manner as described with reference to such figures to provide D.C. load current in two directions with power drawn from the source or pumped back in to the source, or may operate as a single-phase inverter circuit, depending upon the particular sequence of firing of the turn-on, nongate turn-off devices. The circuit shown in FIG. 16 is in many respects similar to the time-ratio control power circuit shown in FIG. 9 in that it employs diacs 64 and 65 as the controlled conducting devices. The commutation circuit employed in the circuit illustrated in FIG. 16 is identical with the commutation circuit shown in FIG. 9, and for that matter, identical with the commutation circuit illustrated in each of the embodiments illustrated herein. Thus, a tightly coupled inductance 18 is shown in series circuit relationship with diacs 64 and 65, a first commutating capacitor 20 is connected between the positive power supply terminal 13 and the tap point of inductance 18, and a second commutating capacitor 22 is connected between the tap point of inductance 18 and the negative power supply terminal 14. A filter circuit comprising inductances 15, 19 and capacitors 21, 17 is connected in the load circuit, and isolating capacitors 63, 63' and small saturable reactors 56 and 56' are employed in the same circuit relationship and operate in the same manner as described with relation to FIGS. 8 and 9 and a further description thereof is believed to be unnecessary. The load circuit comprising load 12 and the filter circuit is connected between the tap point of inductance 18 and a tap point of a direct current power supply which for purposes of illustration is indicated as series connected batteries 88 and 89 but is understood to comprise any direct current power source having suitable voltage and power rating. A series circuit comprising secondary winding 43 and blocking diode 44 (shown dotted in FIG. 16) is preferred for use in conjunction with inductive load circuits since it is better able to cope with the reactive component of the load current stored in the load circuit as described in relation to FIG. 6. Since the operation of the circuit shown in FIG. 16 in the time-ratio control power circuit mode is identical to that described in relation to FIGS. 8 and 9, it is believed that further description thereof is unnecessary. It is sufficient to summarize the operation of the circuit shown in FIG. 16 as a time-ratio control power circuit as follows: Either of the diacs 64 or 65 are turned on to supply load current to load 12 in either of two directions. Then, after a predetermined time interval, the conducting diac is commutated off by the other diac and both diacs are thence in a blocking condition. This sequence is continued in the manner described with relation to FIGS. 1, 2, and 3 to supply a desired level of direct current power to the load. Power from the load may be pumped back to the source in either of two directions in the manner previously described in detail with relation to FIGS. 1–3, 6, 7 and 9.

The inverter circuit mode of operation in FIG. 16 employs two load current carrying diacs 64 and 65 which are used to alternately connect terminals 13 and 14 of the power supply to one end of a load circuit comprising load 12 and the filter circuit. Thus, if diac 64 is turned on by applying an appropriate *dv/dt* signal thereacross and diac 65 is in a blocked condition, terminal 91 of the load circuit is in effect connected to terminal 13 of the power supply and the load circuit is across battery 88. Subsequently, diac 64 is commutated off so that it returns to the blocking condition and diac 65 is simultaneously turned on. With the circuit operating in this fashion, terminal 91 is now connected to terminal 14, thus reversing the polarity of the potential, now battery 89, supplied across the load circuit. Subsequently, diac 65 is commutated off and the circuit is thereby returned to its initial quiescent condition ready for another cycle of operation. From this description, it can be appreciated that the timing or sequence of firing of the load current carrying power diacs serves to connect the load circuit across the center tap 90 of the power supply and terminals 13 or 14 in an alternate manner so as to develop an alternating current flow through the load circuit during successive periods of operation. Since the terminal end 90 of the load circuit remains at a fixed potential throughout the successive periods of operation, the peak-to-peak voltage of the alternating current voltage developed across load 12 is equal to the supply voltage $E_s$ which exists across terminals 13 and 14. Also, since the elements in the inverter mode of operation function in the same manner as in the time-ratio control power circuit and have been described previously in connection with FIGS. 8 and 9, further description of this feature of the circuit is not believed necessary. It should also be expressly noted at this point that alternating current excitation of this and other circuits herein disclosed is possible wherein the circuit when operated as a time ratio control power circuit is employed to chop out any desired portion of either half cycle of an applied alternating current supply voltage as mentioned previously in this specification. With the circuit operated in the inverter mode and using alternating current for excitation, the circuit makes an economical and reliable frequency changer.

FIG. 17 of the drawings illustrates a form of improved single-phase power inverter circuit constructed in accordance with the invention which is similar to that shown in FIG. 16 with the exception that a pair of series connected voltage dividing capacitors 103 and 92 are connected across the power supply terminals 13 and 14 one end of the load circuit is connected to the center tap point 90 of these capacitors and triac circuits are employed in place of diac circuits. It should be understood that in the inverter circuit illustrated in FIG. 16, the turn-on, nongate turn-off solid state controlled conducting devices which are indicated as being diacs may also be triacs. For that matter, in FIGS. 16 and 17, such controlled conducting devices may be any combination of triacs and diacs as shown in FIG. 18. In FIG. 17, feedback circuit means comprising secondary winding 43 and diode 44, shown in dotted line form, may be connected across the power supply terminals and functions in the same manner as illustrated in FIG. 6. Rate of rise of voltage limiting circuits comprising resistors 45, 45′, and capacitors 46, 46′ shown in dotted line form, may be connected across the triacs in the same manner as illustrated in FIG. 6 and operate in the same manner. For purposes of simplification, load 12 and the filter circuit shown in FIG. 16 are indicated in FIG. 17 and hereinafter as load circuit 93. Since one end of load circuit 93 is connected to the tap point 90 of the voltage dividing capacitors 103 and 92, it is obvious that only alternating current may pass through the load circuit 93 and thus the circuit of FIG. 17 is operable as a single-phase power inverter circuit as distinguished from the two modes of operation of the circuit illustrated in FIG. 16. It should be obvious that the circuit illustrated in FIG. 17 can be modified to produce a D.C. output. Thus, the load circuit may include a transformer having suitable rectifier circuitry in a secondary circuit thereof to provide direct current flow through a load connected in such transformer secondary circuit. The load circuit connection at point 90 also limits the peak-to-peak voltage developed across the load circuit to the supply voltage $E_s$ as in the case of the FIG. 16 circuit.

FIG. 18 of the drawings shows a different form of the power circuit illustrated in FIG. 16, the major difference being that a triac 41 is employed in place of diac 64 to indicate that the inverter circuits hereinbefore disclosed are not limited to the use of identical controlled conducting devices. In light of the previous detailed description of the operation of the inverter mode of operation in FIG. 16 and the previous description of the operation of both the triac and diac, their cooperation in the circuit configuration of FIG. 18 is believed to be obvious, and a further description thereof is not necessary. It should be obvious that capacitors 103 and 92 can be substituted for batteries 88 and 89 in the manner shown in FIG. 17 and thereby obtain a pure inverter circuit in FIG. 18.

In the circuits of FIGS. 16 through 18, the commutating capacitors 20, 22 are shown connected between one end of the load circuit and the two power supply terminals 13 and 14. Alternatively, a common commutating capacitor may be employed in place of the two commutating capacitors and connected in parallel circuit relationship with the load circuit.

A three-phase inverter circuit constructed in accordance with the invention is shown in FIG. 19 of the drawings. The three-phase inverter of FIG. 19 is actually constructed from three single-phase inverters of the type shown in FIG. 17 of the drawings with the exception that voltage dividing capacitors are not employed. Hence, all of the elements in the circuit of FIG. 19 have been identified with the same reference numerals which the corresponding elements have in FIG. 17 with the letter *a* being added in the second single-phase inverter circuit and the letter *b* being added in the third phase inverter circuit. Because each of the three single-phase inverters employed in the FIG. 19 circuit are constructed and operate in essentially an identical manner to that described in relation to FIG. 17 (and 16), they will not be described again detail. The outputs of the three single-phase inverters are combined in a delta connected load circuit comprised by one load 98 being connected between the center tap points of inductances 18 and 18*a*, a load 99 connected between center tap points of inductances 18*a* and 18*b*, and a load 100 connected between center tap points of inductances 18 and 18*b*. It would also be possible to combine the outputs in a Y connected load circuit with or without a neutral connected to ground, or with a neutral connected back to the neutral of the direct current power supply. By interconnecting the individual loads of the single-phase inverters in any of the above manners, the outputs of the inverters can be combined to provide a three-phase output. It is, of course, necessary that the timing of the gating-on and turn-off signals applied to the gating electrodes of the several triacs be properly synchronized by the gating signal sources. For this reason, the gating signal source must be especially designed for three-phase operation in the manner of those illustrated and described on pages 130 and 133 of the abovedescribed SCR manual.

Single-phase, full-wave bridge power circuits may also be constructed by employing two single-phase inverter circuit (such as FIG. 16) arrangements modified to provide full-wave bridge operation results in an alternating voltage developed across the load having a peak-to-peak amplitude equal to twice the power supply voltage $E_S$. A full-wave bridge power circuit constructed in accordance with the invention includes two series circuits, each series circuit comprising two bidirectional turn-on, nongate turn-off controlled conducting devices interconnected by a center tapped inductance winding 18, each series circuit being connected across power supply terminals 13 and 14. A load circuit is connected between the two tap points of the two center tapped inductances. Commutating capacitors are arranged in circuit relationship to provide turn-off of selected ones of the bidirectional devices. In a particular circuit of this type, not shown, a common commutating capacitor is connected in parallel circuit relationship with the load circuit. In operation, such a full-wave bridge power circuit functions in essentially the same manner as two single-phase inverters but must employ an appropriate turn-on signal source for simultaneously providing turn-on signals for two of the bidirectional devices to achieve full-wave bridge operation. Because of the fact that such inverter circuit employs a common commutating capacitor, it is necessary that the bidirectional devices be turned on and off in a closely controlled manner to avoid complications in the operation of the circuit.

In order to obviate the need for rigorous synchronization of the firing of the turn-on, nongate turn-off controlled conducting devices in the immediately aforementioned single-phase, full-wave bridge power circuit, the full-wave bridge power circuit of FIG. 20 has been provided. The single-phase full-wave bridge power circuit of FIG. 20 is similar to the immediately aforementioned power circuit with the exception that two commutating capacitors 95, 95′ have been provided in FIG. 20 in place of the single commutating capacitor, and a pair of series connected voltage dividing capacitors 103 and 92 are connected across the direct current power supply with the center tap point 90 of the voltage dividing capacitors connected through the commutating capacitor 95 to the center tap of inductance 18. Similarly, the center tap point of the voltage dividing capacitors is connected through the commutating capacitors 95′ to the center tap of inductance 18′. The load circuit 93 to be supplied is connected between the center tap points of the two inductances 18 and 18′. The operation of the circuit illustrated in FIG. 20 is limited primarily to the lower frequencies such as sixty cycles per second and direct current applications.

In operation, the full-wave bridge power circuit of

FIG. 20 functions in essentially identical fashion to two single-phase inverter circuits of the type immediately aforementioned and operated in a bridge power circuit manner to provide an alternating current flow through the load circuit 93, or a proportionally controlled direct current of either polarity depending on the sequence of turn-on and turn-off of the bidirectional conducting devices with power drawn from the source or pumped back into the source. Because separate commutating circuits are provided for each of the center tapped inductances 18 and 18′, it is no longer essential to so closely synchronize the turning on or turning off of the various turn-on, nongate turn-off controlled conducting devices as was the case with the immediately aforementioned full-wave bridge power circuit. It should be noted, however, that the single phase, full wave bridge power circuit shown in FIG. 20 requires that the commutating capacitors be connected to the voltage dividing capacitors 92 and 103. To obviate this need, a circuit such as that shown in FIG. 21 of the drawings is provided. The full-wave bridge power circuit shown in FIG. 21 is comprised by two single-phase inverter circuits of the type shown in FIG. 17 interconnected through a common load circuit 93 in a manner to provide a direct current path to the load through the bidirectional controlled conducting devices while conducting. Because the full-wave bridge power circuit of FIG. 21 is essentially no different in construction and operation from the two single-phase inverter circuits of the type illustrated and described with relation to FIGS. 16 and 17, the various parts of the circuits have been identified by the same reference numerals and a further description of the construction and operation of the circuit is believed unnecessary. It should be noted, however, that the full wave bridge inverter circuit of FIG. 21 does not require a center tapped direct current power supply even though it does require two additional commutating capacitors. In operation, the FIG. 21 power circuit can be made to provide alternating current flow through the load circuit 93, or proportionally controlled direct current of either polarity depending on the sequence of turn-on and turn-off the bidirectional controlled conducting devices 41′, 16, 41 and 16′ with power drawn from the source or pumped back into the source.

FIG. 22 of the drawings is a more detailed form of the improved bridge power circuit illustrated in FIG. 21, and in particular, illustrates the firing circuit means (gate firing circuits for the particular case of the gate turn-on triac devices) which are identical in construction and operation to the gating circuit and commutation circuit means described in connection with the triac devices of FIG. 7 of the drawings. The gating circuit means associated with each of the load current carrying triac devices 41′ and 16′ are mirror versions of the gating circuit means associated with triac devices 41 and 16 of FIG. 7 and they operate in the same manner. In operation, the gating circuits of triacs 41 and 16′ are phased so that these devices turn on simultaneously and conduct at the same time. Thus, triacs 41 and 16′ serve to operatively connect the terminal 101 of load circuit 93 to terminal 13, and the terminal 102 of load circuit 93 to terminal 14, respectively. Subsequently, triacs 41 and 16′ are commutated off concurrently and the two triacs 41′ and 16 are gated on simultaneously and conduct for the same time period. Upon this occurrence, the terminal 102 will be connected to terminal 13 by triac 41′ and terminal 101 of the load circuit will be connected to terminal 14 by triac 16 thereby reversing the polarity of the potential applied across the load circuit 93. Subsequently, the two load current carrying triacs 41′ and 16 are commutated off thereby returning the inverter circuit to its initial condition ready for a new cycle of operation. Repeated operation of the circuit in this manner then functions to develop an alternating current through the load circuit 93.

FIG. 23 of the drawings shows still another detailed full-wave bridge inverter circuit constructed in accordance with the invention. The circuit shown in FIG. 23 is in many respects similar to the circuit shown in FIG. 21 with the exception that power diac devices 64, 65, 64' and 65' are employed in place of FIG. 21 triac devices 41, 16, 41' and 16', respectively. In addition, the turn-on firing circuits are identical in construction and operation to the turn-on firing circuits described with relation to FIG. 10. Because each of the elements of the gating and commutating circuit means associated with the power diacs are the same, and perform the same function as the correspondingly numbered elements of the FIG. 10 circuit, these elements in FIG. 23 have been given the reference designations employed in FIG. 10 with the addition of subscript 1 to the elements at the left side of the circuit as seen by the reader.

Since the gating and commutation circuit means illustrated in FIG. 23 function precisely the same as the correspondingly numbered elements described with respect to the circuit of FIG. 10, a further description of the construction and operation of these elements is believed unnecessary.

In operation, the inverter circuit of FIG. 23 operates in the same manner as the circuit shown in FIGS. 19–22 in that the load current carrying power diacs 64, 65, 64' and 65' operate to connect terminals 101 and 102 of the load circuit 93 alternately across the power supply terminals 13 and 14 to thereby alternately reverse load current flow through the load circuit. This is achieved by firing the load current carrying diacs 64 and 65' simultaneously, commutating these diacs off, then firing simultaneously the load current carrying diacs 64' and 65, and then commutating these diacs off to thereby complete the cycle of oscillation. By reason of the use of diac load current devices 64, 65, 64', and 65', the frequency of operation of the circuit shown in FIG. 23 can be much higher than the inverter circuits shown in FIGS. 19, 21 and 22.

From the foregoing description, it can be appreciated that the invention provides an entire family of new and improved power circuits employing turn-on, nongate turn-off controlled conducting devices. These new and improved power circuits employ an improved commutation scheme which allows for a reduction in the size of the components employed in the circuits for a given power rating, and hence, can be manufactured economically. Further, it can be appreciated that the invention makes available a whole new family of power circuits which are economical and efficient in operation. These power circuits employing the improved commutation scheme assure commutation which is substantially independent of load from a no load to full load condition of operation. By reason of the improved commutation circuitry, a reduction in the number of components employed in the circuits is possible since the additional or auxiliary turn-on conducting devices often employed in commutation circuits are completely absent, thus, making the manufacture of the circuits less expensive than would be with previous commutation circuits. Further, many difficulties encountered in the manufacture, design, and operation of previously known power circuits are minimized.

Having described several embodiments of the new and improved power circuits in the form of time-ratio control power circuits and inverter circuits, it is believed obvious that other modifications and variations of the invention are possible in the light of the above teachings. It is, therefore, to be understood that changes may be made in the particular embodiments of the invention described which are within the full intended scope of the invention as defined by the appended claims.

What is claimed as new and desired to secure by Letters Patent of the United States is:

1. An improved power circuit using turn-on, nongate turn-off controlled conducting devices including in combination a pair of turn-on, nongate turn-off controlled conducting devices interconnected with a tapped inductance winding in series circuit relationship across a pair of power supply terminals which are adapted to be connected across a source of relatively constant electric potential, means connecting one terminal of the load to the tapped inductance winding, means connecting a remaining terminal of the load to at least one power supply terminal, at least one of said pair of devices comprising a solid state bidirectional conducting device, means for rendering the bidirectional conducting device conducting in a predesigned direction to circulate current through the load from the power supply terminal to which the remaining load terminal is connected during intervals while the opposite one of the pair of devices is non-conducting, and commutation circuit means comprised by said inductance winding and at least one commutating capacitor directly connected between one of the power supply terminals and the tap point of said inductance winding, said pair of conducting devices each being rendered conductive during selected time intervals whereby a proportionally controlled electric current may be supplied to a load circuit having inductive characteristics connected to said inductance winding and the bidirectional conducting device is enabled to circulate the energy discharge from the inductive component of the load current back to the load while it is conducting in said predesigned direction.

2. An improved power circuit using turn-on, nongate turn-off solid state conducting devices including in combination a pair of turn-on, nongate turn-off controlled conducting devices interconnected with a tapped inductance winding in series circuit relationship across a pair of power supply terminals which are adapted to be connected across a source of electric potential, means connecting one terminal of the load to the tapped inductance winding, means connecting a remaining terminal of the load to at least one power supply terminal, at least one of said pair of devices comprising a solid state bidirectional conducting device, means for rendering the bidirectional conducting device conducting in a predesigned direction to circulate current through the load from the power supply terminal to which the remaining load terminal is connected during intervals while the opposite one of the pair of devices is non-conducting, and commutation circuit means comprised by said inductance winding and a pair of series connected commutating capacitors connected across the power supply terminals, the juncture of said commutating capacitors being directly connected to the tap point of said inductance winding, said pair of conducting devices each being rendered intermittently conducting at selected time intervals whereby an electric current is caused to flow in a load circuit connected to the tap point of said inductance winding and the bidirectional conducting device is enabled to circulate the energy discharge from the inductive component of the load current back to the load while it is conducting in said predesigned direction.

3. An improved power circuit using turn-on, nongate turn-off solid state conducting devices including in combination a pair of turn-on, nongate turn-off solid state controlled conducting devices, at least one of said pair of devices comprising a bidirectional conducting device, a tapped inductance winding operatively connected between said pair of devices to form a series circuit, the series circuit so formed being connected across a pair of power supply terminals which are adapted to be connected across a source of electric potential, commutation circuit means comprising said tapped inductance winding and a pair of series connected commutating capacitors connected across the power supply terminals, the juncture of said commutating capacitors being directly connected to the tap point of said tapped inductance winding, filter circuit means connected to the tap point of said tapped inductance winding, means for rendering a first of said conducting devices conducting during a first selected time interval whereby an electric current is caused to flow from the source of electric potential to a load connected to the tap point of said tapped inductance winding through said filter circuit means, means for rendering a second of said conducting devices comprising the bidirectional conducting device conducting in a first direction during a second selected time interval whereby said first conducting device is commutated off, and means for rendering said second conducting device conducting in a second direction during a third selected time interval whereby load current continues to circulate in the load due to energy storage within the filter circuit means.

4. An improved power circuit using turn-on, nongate turn-off solid state conducting devices including in combination a pair of turn-on, nongate turn-off solid state bidirectional controlled conducting devices, a tapped inductance winding operatively connected between said pair of bidirectional conducting devices to form a series circuit, the series circuit so formed being connected across a pair of power supply terminals which are adapted to be connected across a source of electric potential, commutation circuit means comprising said tapped inductance winding and a pair of series connected commutating capacitors connected across the power supply terminals, the juncture of said commutating capacitors being directly connected to the tap point of said tapped inductance winding, filter circuit means connected to the tap point of said tapped inductance winding, said filter circuit means comprising at least one filter inductor for storing electric energy therein and a load connected between said filter inductor and a power supply terminal, first firing circuit means for rendering a first of said conducting devices selectively conducting in a first direction to supply electric current from the source of electric potential to the load circuit in a first load current carrying direction through the filter inductor, second firing circuit means for rendering the second of said conducting devices conducting in a first direction to facilitate selective commutation off of said first conducting device, third means for rendering said second conducting device conducting in a second direction whereby load current continues to circulate through the load circuit due to energy storage within the filter inductor, said second firing circuit serving to render the second conducting device intermittently conducting in the first direction, and fourth means for rendering the first conducting device conducting in a second direction to feed back electric current from the load circuit to the source of electric potential.

5. An improved power circuit using turn-on, nongate turn-off solid state conducting devices including in combination a pair of turn-on, nongate turn-off solid state controlled conducting devices, at least one of said devices comprising a bidirectional conducting device, a tapped inductance winding operatively connected between said pair of conducting devices in series circuit relationship, the series circuit so formed connected across a pair of power supply terminals which are adapted to be connected across a source of electric potential, a load circuit including a series connected filter inductor, said load circuit being connected in series circuit relationship through said filter inductor with a first of said pair of conducting devices and being connected through said filter inductor between the tap point of said tapped inductance winding in parallel circuit relationship with a second of said pair of conducting devices wherein said second conducting device comprises the bidirectional conducting device, first firing circuit means coupled to the first conducting device for causing said first device to conduct at desired intervals and thereby provide a flow of load current from the source of electric potential to the load circuit, second firing circuit means coupled to the second conducting device for causing said second device to conduct in a first commutating direction at desired intervals relative to the conduction of the first device, commutation circuit means comprising said tapped inductance winding and a pair of series connected commutating capacitors connected across the power supply terminals, the juncture of said commutating capacitors being directly connected to the tap point of said tapped inductance winding, said commutation circuit means being operable upon the second conducting device being caused to conduct in a first direction whereby said commutating capacitors discharge through the load circuit and thereby commutate off said first conducting device, and third means coupled to said second conducting device for causing said second device to conduct current in a second predetermined coasting direction to circulate the energy discharge from the inductive component of the load circuit back to the load while it is conducting in the second predetermined coasting direction.

6. The combination set forth in claim 5 wherein said first conducting device is a diac, and said power circuit further includes feedback current firing circuit means coupled to said diac for causing said diac to conduct feedback current in a direction reverse to the flow of load current.

7. The combination set forth in claim 5 wherein said second conducting device is a diac, and said power circuit further includes a pulse forming saturable reactor connected between said tapped inductance winding and said diac.

8. The combination set forth in claim 5 wherein said second conducting device is a diac, and said power circuit further includes at least one isolating capacitor connected at a first end thereof between said diac and said tapped inductance winding and at a second end thereof to the power supply terminal connected to said diac.

9. The combination set forth in claim 5 wherein said first conducting device is a triac, and said power circuit further includes feedback current firing circuit means coupled to said triac for causing said triac to conduct feedback current in a direction reverse to the flow of load current.

10. The combination set forth in claim 5 wherein said second conducting device is a triac and said power circuit is further characterized by the addition of a series circuit comprising a third inductance winding magnetically coupled to said tapped inductance winding, and a diode, said latter series circuit being connected across the power supply terminals for limiting the reverse voltage across the conducting devices.

11. The combination set forth in claim 5 wherein said second conducting device is a triac, and said power circuit is further characterized by the addition of a series circuit comprising a resistance and a third capacitor connected across said triac for limiting the rate of rise of voltage across said triac.

12. An improved power circuit using turn-on, nongate turn-off controlled conducting devices including in combination a first turn-on, nongate turn-off solid state bidirectional controlled conducting device, a tapped inductance winding, and a second turn-on, nongate turn-off solid state bidirectional controlled conducting device all connected in series circuit relationship in the order named across a pair of power supply terminals that in turn are adapted to be connected across a direct current power supply, a load circuit including a series connected filter inductor, said load circuit connected between the tap point of said tapped inductance winding and the power supply terminal connected to said second conducting device, commutation circuit means comprising said tapped inductance winding and a pair of series connected commutating capacitors connected across the power supply terminals, the juncture of said commutating capacitors being directly connected to the tap point of said tapped inductance winding, first firing circuit means operataively connected to said first conducting device to conduct in a first direction at first desired intervals and thereby conduct load current to the load circuit, second firing circuit means operatively connected to said second conducting device for causing said second conducting device to conduct in a first direction at desired intervals relative to the conduction of said first conducting device and thereby commutate off said first conducting device, third firing circuit means operatively connected to said second conducting device for causing said second conducting device to conduct in a second direction at desired intervals and thereby circulate the inductive component of the load current back to the load through a circuit comprising said second conducting device and said load circuit, said second firing circuit means being operated at second desired intervals for causing said second conducting device to conduct in the first direction and thereby initiate a feedback mode of circuit operation, fourth means operatively connected to said first conducting device for causing said first conducting device to conduct in a second direction at desired intervals relative to the conduction of said second conducting device when operable in the feedback mode to thereby feed back current from the load circuit to the power supply, and clamping means interconnecting said firing circuit means for clamping off said fourth firing means during the commutation intervals.

13. An improved power circuit using turn-on, nongate turn-off controlled conducting devices including in combination at least first and second turn-on, nongate turn-off solid state bidirectional controlled conducting devices operatively interconnected with a tapped inductance winding in series circuit relationship across a pair of supply terminals which are adapted to be connected across an electric current power supply, a load circuit including an inductive component, means for connecting one terminal of said load circuit to the tap point of said tapped inductance winding, means for connecting the remaining terminal of the load circuit to at least one terminal of the power supply, commutation circuit means comprising said tapped inductance winding and at least one commutating capacitor, said commutating capacitor being directly connected to the tap point of said inductance winding and being connected to one terminal of the power supply, first firing circuit means for selectively rendering a first of said conducting devices selectively conducting in a first direction to supply electric current from the electric current power supply to the load circuit in a first load current carrying direction to thereby cause the circuit to operate in a first mode, second firing circuit means for rendering the second of said conducting devices conducting in a first direction to facilitate selective commutation off of said first conducting device, said second conducting device being automatically turned off at the end of the commutation off of said first device, and third means for rendering said second conducting device conducting in a second direction whereby load current continues to circulate in the load circuit due to energy storage within the inductive component while maintaining said second device off in the first direction, said first firing circuit means thereafter rendering said first conducting device conducting in the first direction to initiate a new cycle of operation and turn-off said second conducting device from conducting in the second direction.

14. An improved power circuit using turn-on, nongate turn-off controlled conducting devices including in combination a pair of turn-on, nongate turn-off solid state bidirectional controlled conducting devices operatively interconnected with a tapped inductance winding in series circuit relationship across a pair of power supply terminals which are adapted to be connected across a tapped direct current power supply, a load circuit including a series connected filter inductor connected between the tap point of said tapped inductance winding and the tap point of the power supply, commutation circuit means comprising said tapped inductance winding and a pair of series connected capacitors connected across the power supply terminals, the juncture of said commutating capacitors being directly connected to the tap point of said tapped inductance winding, first firing circuit means for selectively rendering a first of said conducting devices selectively conducting in a first direction to supply electric current from the power supply to the load circuit in a first load current carrying direction to thereby cause the circuit to operate in a first mode, second firing circuit means for rendering the second of said conducting devices conducting in a first direction to facilitate selective commutation off of said first conducting device, said second conducting device being automatically turned-off at the end of the commutation off of said first device, third firing circuit means for rendering said second conducting device conducting in a second direction whereby load current continues to circulate in the load circuit due to energy storage within the filter inductor while maintaining said second device off in the first direction, said first firing circuit means thereafter rendering said first conducting device conducting in the first direction to initiate a new cycle of operation and turn off said second device from conducting in the second direction, and additional firing circuit means for rendering the said pair of conducting devices intermittently conducting during alternate intervals of time of selected duration whereby the power circuit is operable in a second mode to provide controlled alternating current flow through the load.

15. An improved power circuit using turn-on, nongate turn-off controlled conducting devices including in combination a pair of turn-on, nongate turn-off solid state bidirectional controlled conducting devices operatively interconnected with a tapped inductance winding in series circuit relationship across a pair of power supply terminals which are adapted to be connected across a source of electric potential, a pair of voltage dividing capacitors connected in series circuit relationship across the power supply terminals, a load circuit having inductive characteristics connected between the juncture of the voltage dividing capacitors and the tap point of said tapped inductance winding, and commutation circuit means comprised by said tapped inductance winding and a pair of series connected commutating capacitors connected across the power supply terminals, the juncture of said commutating capacitors being directly connected to the tap point of said tapped inductance winding, first firing circuit means for selectively rendering a first of said conducting devices selectively conducting in a first direction to supply electric current from the source of electric potential to the load circuit in a first load current carrying direction to thereby cause the circuits to operate in a first mode, second firing circuit means for rendering the second of said conducting devices conducting in a first direction to facilitate selective commutation off of said first conducting device, said second conducting device being automatically turned-off at the end of the commutation off of said first device, third firing circuit means for rendering said second conducting device conducting in a second direction whereby load current continues to circulate in the load circuit due to energy storage within the inductive component of the load circuit means thereafter rendering said first conducting device conducting in the first direction to initiate a new cycle of operation and turn-off said second conducting device from conducting in the second direction, and additional firing circuit means for rendering said pair of conducting devices intermittently conducting during alternate intervals of time of selected duration whereby the power circuit is operable in a second mode to provide controlled alternating current flow through the load.

16. A power circuit according to claim 1 wherein both of said turn-on, nongate turn-off controlled conducting devices are bidirectional conducting devices.

17. A power circuit according to claim 2 wherein both of said turn-on, nongate turn-off controlled conducting devices are bidirectional conducting devices.

18. An improved multiphase power circuit using turn-on, nongate turn-off controlled conducting devices includin combination a plurality of single phase power circuits according to claim 17 wherein the multiphase load elements are interconnected between the tapped inductance windings of the several single phase power circuits.

19. A power circuit according to claim 17 wherein the means for connecting the remaining terminal of the load circuit to at least one terminal of the power supply comprises a pair of turn-on, nongate turn-off, solid state bidirectional controlled conducting devices connected in series circuit relationship with a second tapped inductance winding across the pair of power supply terminals with said remaining terminal of the load being connected to the second tapped inductance winding.

20. An improved bridge power circuit including in combination two series circuits connected in parallel circuit relationship across a pair of power supply terminals adapted to be connected to a source of electric potential, said series circuits being comprised by first, second, third and fourth turn-on, nongate turn-off solid state bidirectional controlled conducting devices, a first tapped inductance winding operatively interconnecting the first and second conducting devices in series circuit relationship across the power supply terminals, a second tapped inductance winding operatively interconnecting the third and forth conducting devices in series circuit relationship across the power supply terminals, a load circuit interconnecting the tap points of said tapped inductance windings, communtation circuit means comprised by said tapped inductance windings, commutation circuit means comprised by said tapped inductance windings and at least two commutating capacitors, each of said commutating capacitors having one terminal directly connected to one of said tapped inductance windings and the remaining terminal connected to a power supply terminal, first and fourth firing circuit means for selectively rendering the first and fourth conducting devices selectively conducting in a first direction to supply electric current from the source of electric potential to the load circuit in a first load current carrying direction to thereby cause the circuit to operate in a first mode, second firing circuit means for rendering the second of said conducting devices conducting in a first direction to facilitate selective commutation off of said first conducting device, said second conducting device being automatically turned off at the end of the commutation off of said first device, third means for rendering said second conducting device conducting in a second direction whereby load current continues to circulate through the second and fourth devices in the load circuit due to energy storage within the inductive component while maintaining said second device off in the first direction, said first firing circuit means thereafter rendering said first conducting device conducting in the first direction to initiate a new cycle of operation and turn-off said second conducting device from conducting in the second direction.

21. An improved power circuit using turn-on, nongate turn-off controlled conducting devices including in combination at least first and second turn-on, nongate turn-off, solid state controlled conducting devices operatively interconnected with a tapped inductance winding in series circuit relationship across a pair of power supply terminals which are adapted to be connected across an electric current power supply, at least said second controlled conducting device comprising a bidirectional conducting device, a load circuit including an inductive component, means for connecting one terminal of said load circuit to the tap point of said tapped inductance wnding, means for connecting the remaining terminal of said load circuit to at least one terminal of the power supply, commutation circuit means comprising said tapped inductance winding and at least one commutating capacitor, said commutating capacitor being directly connected to the tap point of said inductance winding and being directly connected to one terminal of the power supply, first firing circuit means for selectively rendering a first of said conducting devices selectively conducting in a first direction to supply electric current from the source of electric potential to the load circuit in a first load current carrying direction to thereby cause the circuit to operate in a first mode, second firing circuit means for rendering the second of said conducting devices conducting in a first direction to facilitate selective commutation off of said first conducting device, said second conducting device being automatically turned off at the end of the commuation off of said first device, third means for rendering said second conducting device conducting in a second direction whereby load current continues to circulate in the load circuit due to energy storage within the inductive component while maintaining said second device off in the first direction, said first firing circuit means thereafter rendering said first conducting device conducting in the first direction to initiate a new cycle of operation and turn-off said second conducting device from conducting in the second direction.

22. An improved power circuit according to claim 21 wherein both of said controlled conducting devices are bidirectional controlled conducting devices.

23. An improved power circuit according to claim 22 wherein there are two commutating capacitors each one having one terminal directly connected to the tap point of the inductance winding and having the remaining terminal connected to a respective power supply terminal.

24. A power circuit according to claim 21 wherein both said controlled conducting devices are bidirectional conducting devices, the second firing circuit means includes means for selectively rendering the second controlled conducting device conducting in the first direction to selectively charge the inductive component of the load circuit from energy in the load, the first firing circuit means renders the first device conducting in the first direction to facilitate commutation off of said second device in the first direction, said first conducting device thereafter being automatically turned off at the end of the commutation of said second device in the first direction, and wherein the first firing circuit means includes means for rendering the first controlled conducting device conducting in a second direction to pump current from the charged inductive component back to the power supply.

25. A power circuit according to claim 24 wherein the second firing circuit means renders the second controlled conducting device selectively conducting in the first direction to supply reverse polarity current flow through the load, the first firing circuit means selectively renders the first conducting device conductive in the first direction to facilitate commutation off of said second conducting device in the first direction, said first conducting device being automatically turned off at the end of the commutation off of said second device, and said means renders the first controlled conducting device conducting in the second direction whereby reverse polarity load current continues to circulate in the load circuit due to reverse energy storage within the inductive component while maintaining said first device off in the first direction, said second firing circuit means thereafter rendering said second device conducting in the first direction to initiate a new cycle of reverse operation and turn-off said second conducting device from conducting in the second direction.

26. A power circuit according to claim 25 wherein the first firing circuit means for rendering the first conducting device conducting in the first direction selectively charges the inductive component of the load circuit from energy in the load, the second firing circuit renders the second device selectively conducting in the first direction to facilitate commutation off of said first device in the first direction, said second conducting device thereafter being automatically turned off at the end of the commutation off of said first device in the first direction, and the third means renders the second controlled conducting device conducting in the second direction to pump current from the charged inductive component back to the power supply.

27. A power circuit according to claim 26 wherein the means for connecting the remaining terminal of the load circuit to at least one terminal of the power supply comprises a pair of turn-on, nongate turn-off, solid state bidirectional controlled conducting devices connected in series circuit relationship with each other across the pair of power supply terminals with remaining terminals of the load being connected to the juncture of the controlled conducting devices.

28. A power circuit according to claim 21 wherein said first and second firing circuit means render said pair of conducting devices intermittently conducting at a first frequency to provide alternate intervals of conduction of selected duration whereby the power circuit is operable in a second mode to provide controlled alternating current flow through the load at an operating frequency which is less than said first frequency.

29. A bridge power circuit according to claim 20 further including third firing circuit means for selectively rendering said third bidirectional conducting device conducting in a first direction to facilitate commutation off of said fourth device, said third device thereafter being automatically turned off at the end of the commutation of said fourth device.

30. A bridge power circuit according to claim 29 wherein the second firing circuit means selectively renders the second, controlled conducting device conducting in the first direction, and wherein the bridge power circuit further includes fourth means for rendering the fourth controlled conducting device conducting in a second direction to selectively charge the inductive component of the load circuit with energy supplied from the load, the first firing circuit means renders the first device conducting in the first direction to facilitate commutation off of said second device in the first direction, said first conducting device thereafter being automatically turned off at the end of the commutation of said second device in the first direction, and first means for rendering the first device conductive in the second direction to pump current from the charged inductive component of the load back to the power supply.

31. A bridge power circuit according to claim 30 wherein the second firing circuit means renders the second controlled conducting device selectively conducting in the first direction, the third firing circuit means renders the third controlled conducting device conducting in a first direction substantially simultaneously with the first device to supply reverse polarity current flow through the load, the first firing circuit means selectively renders the first conducting device conductive in the first direction to facilitate commutation off of said second conducting device in the first direction, said first conducting device being automatically turned off at the end of the commutation off of said second device, said first means thereafter rendering the first controlled conducting device conducting in the second direction while maintaining said third device on in the first direction whereby reverse polarity load current continues to circulate in the load circuit due to reverse energy storage within the inductive component while maintaining said first device off in the first direction, said second firing circuit means thereafter rendering said second device conducting in the first direction to initiate a new cycle of reverse operation and turn-off said first conducting device from conducting in the second direction.

32. A bridge power circuit according to claim 31 further comprising means for selectively controlling said fourth firing circuit means to render said fourth bidirectional conducting device conducting in a first direction to facilitate commutation off of said third device, said fourth device thereafter being automatically turned off at the end of the commutation off of said third device.

33. A bridge power circuit according to claim 32 wherein the first firing circuit means for rendering the first conducting device conducting in the first direction selectively turns on the first device and the third means renders the third device conductive in the second direction to charge the inductive component of the load circuit from the load, the second firing circuit means renders the second device selectively conducting in the first direction to facilitate commutation off of said first device in the first direction, said second conducting device thereafter being automatically turned-off at the end of the commutation off of said first device in the first direction, and the second means renders the second controlled conducting device conducting in the second direction to pump current from the charged inductive component back to the power supply.

34. An improved power circuit using turn-on, nongate turn-off controlled conducting devices including in combination at least first and second turn-on, nongate turn-off, solid state bidirectional controlled conducting devices operatively interconnected in series circuit relationship across a pair of power supply terminals which are adapted to be connected across an electric current power supply, a load circuit including an inductive component, means for connecting one terminal of said load circuit to the juncture of said controlled conducting devices, means for connecting the remaining terminal of said load circuit to at least one terminal of the power supply, first and second commutation circuit means operatively connected across respectives ones of said controlled conducting devices, first firing circuit means for selectively rendering a first of said controlled conducting devices selectively conducting in a first direction to supply electric current from the source of electric potential to the load circuit in a first load current carrying direction to thereby cause the circuit to operate in a first mode, said first commutation circuit means thereafter operating to commutate off of said first conducting device, means comprising a part of second firing circuit means for rendering said second conducting device conducting in a second direction whereby load current continues to circulate in the load circuit due to energy storage within the inductive component while maintaining said second device off in the first direction, said first firing circuit means thereafter rendering said first conducting device conducting in the first direction to initiate a new cycle of operation and turn-off said second conducting device from conducting in the second direction, second firing circuit means for selectively rendering the second controlled conducting device conducting in the first direction to selectively charge the inductive component of the load circuit from energy in the load, said second commutation circuit means thereafter serving to commutate off the second controlled conducting device, said first firing circuit means including means for rendering the first controlled conducting device conducting in a second direction to pump current from the charged inductive component back to the power supply, said second firing circuit means also serving to render the second controlled conducting device selectively conducting in the first direction to supply reverse polarity current flow through the load from the power supply, said second commutation circuit means thereafter serving to commutate off said second controlled conducting device in the first direction, and said first firing circuit means thereafter serving to render the first controlled conducting device conducting in the second direction whereby reverse polarity load current continues to circulate in the load circuit due to reverse energy storage within the inductive component while maintaining said first device off in the first direction, said second firing circuit means thereafter renderng said second device conducting in the first direction to initiate a new cycle of reverse operation and turn-off said first conducting device from conducting in the second direction.

35. A power circuit according to claim 34 wherein the first firing circuit means for rendering the first conducting device conducting in the first direction selectively charges the inductive component of the load circuit from reverse energy in the load, the first commutation circuit means commutates off the first conducting device and the second firing circuit means renders the second controlled conducting device conducting in the second direction to pump current from the reversely charged inductive component back to the power supply.

36. A power circuit according to claim 35 wherein the means for connecting the remaining terminal of the load circuit to at least one terminal of the power supply comprises a second pair of turn-on, nongate turn-off, solid state bidirectional controlled conducting devices connected in series circuit relationship with each other across the pair of power supply terminals with remaining terminals of the load being connected to the juncture of the second pair of controlled conducting devices.

37. A power circuit according to claim 35 wherein said first and second firing circuit means render the first and second bidirectional controlled conducting devices intermittently conducting at a first frequency to provide alternate intervals of conduction of selected duration whereby the power circuit is operable in a second mode to provide controlled alternating current flow through the load at an operating frequency which is less than said first frequency.

38. An improved power circuit according to claim 37 wherein the means for connecting the remaining terminal of the load to at least one terminal of the power supply comprises at least one capacitor.

39. An improved bridge power circuit including in combination first and second series circuits connected in parallel circuit relationship across a pair of power supply terminals adapted to be connected to an electric current power supply, said first and second series circuits comprising, respectively, first and second, and third and fourth controlled turn-on, nongate turn-off solid state bidirectional controlled conducting devices connected in series circuit relationship across the power supply terminals whereby said first and fourth and said second and third devices are diagonally opposed, a load circuit interconnected between the juncture of the first and second and the juncture of the third and fourth bidirectional controlled conducting devices, communtation circuit means operatively connected across at least one device of each diagonally opposed pair of devices, first and fourth firing circuit means for selectively rendering the diagonally opposed first and fourth conducting devices selectively conducting in a first direction to supply electric current from the source of electric potential to the load circuit in a first load current carrying direction to thereby cause the circuit to operate in a first mode, means for effecting selective commutation off of said first device by said commutation circuit means, said fourth device being maintained conducting by current through the load circuit, second firing circuit means including means for rendering said second conducting device conducting in a second direction whereby load current continues to circulate through the second and fourth devices in the load circuit due to energy storage within the inductive component while maintaining said second device in the first direction, said first firing circuit means thereafter rendering said first conducting device conducting in the first direction to initiate a new cycle of operation and turn-off said second device from conducting in the second direction.

40. A bridge power circuit according to claim 38 further including means for selectively commutating off said fourth controlled conducting device with said commutation circuit means.

41. A bridge power circuit according to claim 40 wherein the second firing circuit means selectively renders the second, controlled conducting device conducting in the first direction, and wherein the fourth firing circuit means further includes means for rendering the fourth controlled conducting device conducting in a second direction to selectively charge the inductive component of the load with energy supplied from the load means for effecting commutation off of said second device in the first direction by said commutation circuit means, and said first firing circuit means further includes first means for rendering the first device conductive in the second direction to pump current from the charged inductive component of the load back to the power supply.

42. A bridge power circuit according to claim 41 wherein the second firing circuit means renders the second controlled conducting device selectively conducting in the first direction, and further includes third firing circuit means for rendering the third controlled conducting device conducting in a first direction substantially simultaneously with turn-on of the first device by the first firing circuit means to supply reverse polarity current flow through the load, means for effecting commutation off of said third controlled conducting device with said commutation circuit means, said first means then serving to render the first controlled conducting device conducting in the second direction whereby reverse polarity load current continues to circulate in the load circuit due to reverse energy storage within the inductive component while maintaining said first device off in the first direction, said second firing circuit means thereafter serving to render said second device conducting in the first direction to initiate a new cycle of reverse operation and turn-off said first conducting device from conducting in the second direction.

43. A bridge power circuit according to claim 42 further comprising means for selectively commutating off said second controlled device with said commutation circuit means.

44. A bridge power circuit according to claim 43 wherein the first firing circuit means for rendering the first controlled conducting device conducting in the first direction selectively turns on the first device and the third means renders the third device conductive in the second direction to reversely charge the inductive component of the load circuit with energy supplied from the load, the first controlled conducting device is commutated off by said commutation circuit means, and the second means renders the second controlled conducting device conducting in the second direction to pump reverse current from the charged inductive component back to the power supply.

References Cited

UNITED STATES PATENTS 3,360,712 12/1967 Morgan ------------ 307—305

FOREIGN PATENTS 945,249 12/1963 Great Britain.

OTHER REFERENCES

General Electric Silicon Controlled Rectifier Manual, 2nd ed., December 1961, pp. 74, 141.

JOHN S. HEYMAN, Primary Examiner

D. M. CARTER, Assistant Examiner

U.S. Cl. X.R.

307—252, 296